(12) United States Patent
Kotzur et al.

(10) Patent No.: US 11,436,086 B2
(45) Date of Patent: *Sep. 6, 2022

(54) RAID STORAGE-DEVICE-ASSISTED DEFERRED PARITY DATA UPDATE SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,390

(22) Filed: May 5, 2021

(65) Prior Publication Data
US 2021/0255924 A1    Aug. 19, 2021

Related U.S. Application Data

(63) Continuation of application No. 16/586,451, filed on Sep. 27, 2019, now Pat. No. 11,023,321.

(51) Int. Cl.
| | | |
|---|---|---|
| G06F 11/10 | (2006.01) | |
| G11C 29/52 | (2006.01) | |
| G11C 29/04 | (2006.01) | |
| H04L 1/00 | (2006.01) | |
| H03M 13/00 | (2006.01) | |
| H03M 13/11 | (2006.01) | |

(Continued)

(52) U.S. Cl.
CPC .......... *G06F 11/1076* (2013.01); *G06F 13/28* (2013.01)

(58) Field of Classification Search
CPC ... G06F 11/1096; G06F 11/1076; G06F 13/28
See application file for complete search history.

(56) References Cited

U.S. PATENT DOCUMENTS

| | | |
|---|---|---|
| 5,720,025 A | 2/1998 | Wilkes et al. |
| 5,774,641 A | 6/1998 | Islam et al. |

(Continued)

*Primary Examiner* — Guy J Lamarre
(74) *Attorney, Agent, or Firm* — Joseph Mencher

(57) ABSTRACT

A RAID storage-device-assisted deferred parity data update system includes a RAID primary data drive that retrieves second primary data via a DMA operation from host system, and XOR's it with first primary data to produce first interim parity data, which causes a RAID storage controller device to provide an inconsistent parity stripe journal entry in the host system. The RAID primary data drive then retrieves third primary data via a DMA operation from the host system, XORs it with the second primary data and the first interim parity data to produce second interim parity data. A RAID parity data drive retrieves the second interim parity data via a DMA operation, and XORs it with first parity data to produce second parity data that it uses to overwrite the first parity data, which causes the RAID storage controller device to remove the inconsistent parity stripe journal entry from the host system.

20 Claims, 22 Drawing Sheets

(51) Int. Cl.
*G11C 16/26* (2006.01)
*G11C 16/34* (2006.01)
*G11C 16/04* (2006.01)
*G11C 11/56* (2006.01)
*G06F 13/28* (2006.01)

(56) References Cited

U.S. PATENT DOCUMENTS

| | | |
|---|---|---|
| 6,526,477 B1 | 2/2003 | Yuan et al. |
| 9,384,093 B1 | 7/2016 | Aiello |
| 11,023,321 B2 * | 6/2021 | Kotzur ............... G06F 11/1076 |
| 2009/0144497 A1 | 6/2009 | Withers |
| 2010/0106906 A1 | 4/2010 | Galloway et al. |
| 2010/0312961 A1 * | 12/2010 | Koul ................... G06F 11/1076 711/114 |
| 2011/0264857 A1 | 10/2011 | Delaney |
| 2014/0189212 A1 | 7/2014 | Slaight et al. |
| 2015/0286438 A1 | 10/2015 | Simionescu et al. |
| 2016/0246678 A1 | 8/2016 | Galbraith et al. |
| 2017/0168896 A1 | 6/2017 | Karrotu et al. |
| 2018/0203765 A1 | 7/2018 | Critchley et al. |

* cited by examiner

RAID STORAGE-DEVICE-ASSISTED DEFERRED PARITY DATA UPDATE SYSTEM

CROSS-REFERENCE TO RELATED APPLICATIONS

This application is a continuation of U.S. patent application Ser. No. 16/586,451, filed on Sep. 27, 2019, the disclosure of which is incorporated by reference in its entirety.

BACKGROUND

The present disclosure relates generally to information handling systems, and more particularly to performing deferred parity data update operations in an information handling system with the assistance of RAID storage devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and that performance is even projected to be much greater than the performance capabilities of next-generation RAID storage controllers), which results in those RAID storage controllers being unable to manage more than a few NVMe storage devices (e.g., conventional RAID storage controllers are currently capable of managing approximately four NVMe storage devices). As such, the use of NVMe storage devices in RAID storage subsystems present RAID storage system scaling issues, as the RAID storage controllers cannot scale with more than a few NVMe storage devices.

Accordingly, it would be desirable to provide a RAID storage system that addresses the issues discussed above.

SUMMARY

According to one embodiment, an Information Handling System (IHS) includes a Redundant Array of Independent Disk (RAID) primary data storage device that includes a first storage subsystem storing first primary data, a first buffer subsystem, and a second buffer subsystem, wherein the RAID primary data storage device is configured, in response to a first command received from a RAID storage controller device, to: write, to the first buffer subsystem via a first Direct Memory Access (DMA) operation from a host system, second primary data; perform an XOR operation on the first primary data in the first storage subsystem and the second primary data in the first buffer subsystem to produce first interim parity data; write, to the second buffer subsystem, the first interim parity data; send a first completion message to the RAID storage controller device that causes the RAID storage controller to provide a journal entry in the host system that indicates an inconsistent parity stripe, wherein the RAID primary data storage device is configured, in response to a second command received from the RAID storage controller device, to: write, to the first buffer subsystem via a second DMA operation from the host system, third primary data; perform an XOR operation on the second primary data in the first storage subsystem, the third primary data in the first buffer subsystem, and the first interim parity data in the second buffer subsystem to produce second interim parity data; write, to the second buffer subsystem, the second interim parity data; a RAID parity data storage device that includes a second storage subsystem storing first parity data and a third buffer subsystem, wherein the RAID parity data storage device is configured, in response to a third command received from the RAID storage controller device, to: write, to the third buffer subsystem via a third DMA operation from the second buffer subsystem, the second interim parity data; perform an XOR operation on the first parity data in the second storage subsystem and the second interim parity data in the third buffer subsystem to produce second parity data; overwrite, in the second storage subsystem, the first parity data with the second parity data; and send a second completion message to the RAID storage controller device that causes the RAID storage controller to remove the journal entry in the host system that indicates the inconsistent parity stripe.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
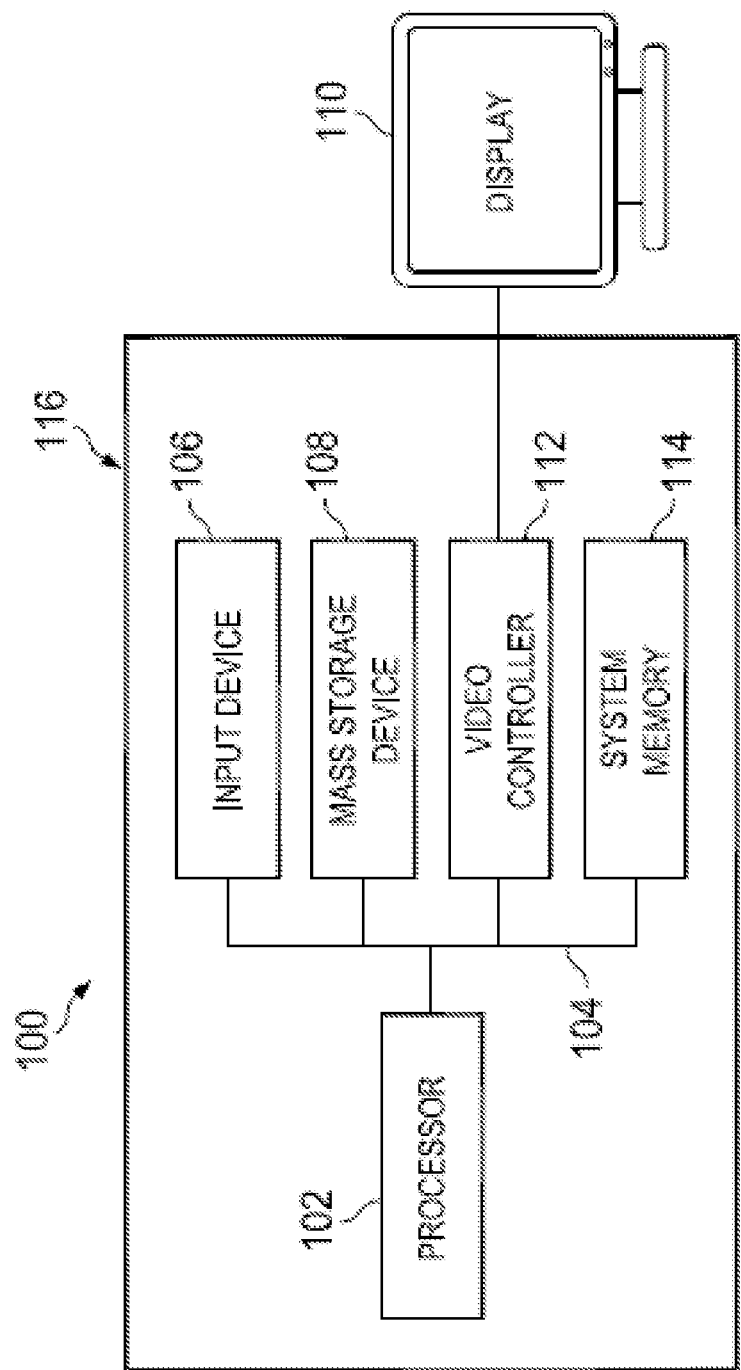
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
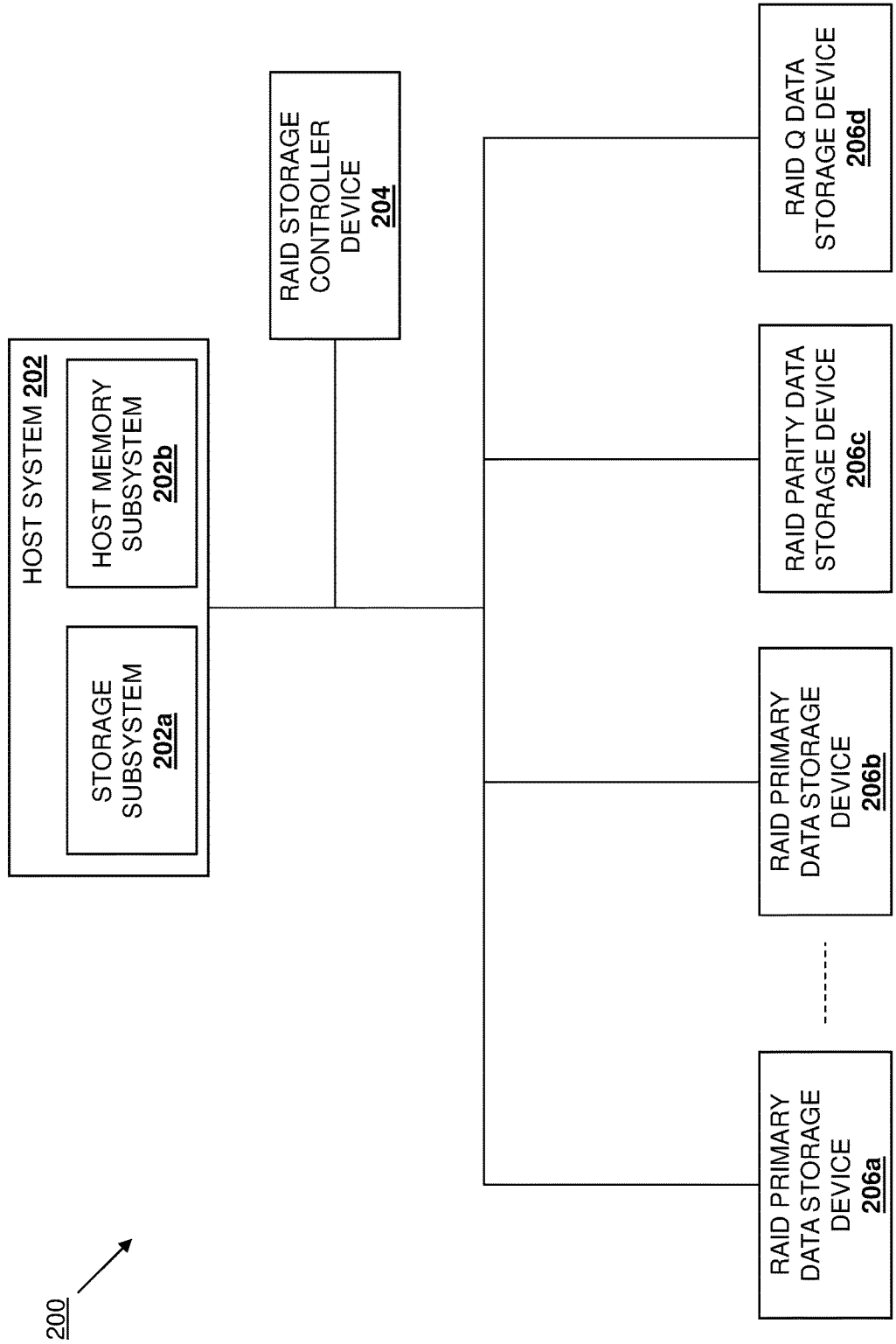
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. The host system 202 includes a storage subsystem 202a that, in the examples below, is provided by an Non-Volatile Dual Inline Memory Module (NVDIMM) memory device/memory system, but that one of skill in the art in possession of the present disclosure will recognize may be provided by a variety of non-volatile/persistent memory devices while remaining within the scope of the present disclosure as well. Furthermore, while illustrated as included in and/or otherwise local to the host system 202, the storage subsystem 202a may be provided outside of and/or otherwise remote from the host system 202, and one of skill in the art in possession of the present disclosure will appreciate that any storage subsystem under the control of the host system 202 may operate as the storage subsystem 202a discussed below. The host system 220 also includes a host memory subsystem 202b that one of skill in the art in possession of the present disclosure will recognize may be provided by a variety of memory devices/memory systems utilized by processors (e.g., a host processing subsystem, not illustrated) to store data prior to writing that data to RAID storage devices, as discussed below.

In the illustrated embodiment, the RAID storage system 200 also includes a RAID storage controller device 204 that is coupled to the host system 202 and that may be provided by the IHS 100 discussed above with reference to FIG. 1, and/or may include some or all of the components of the IHS 100. For example, the RAID controller device 204 may include any storage device/disk array controller device that is configured to manage physical storage devices and present them to host systems as logical units. Furthermore, the RAID storage system 200 also includes a plurality of RAID storage devices that are illustrated in FIG. 2 as a plurality of RAID primary data storage devices 206a, 206b, and up to 206c, along with a RAID parity storage data device 206d, each of which is coupled to the host system 202 and the RAID storage controller device 204. As will be appreciated by one of skill in the art in possession of the present disclosure, the RAID storage devices in the RAID storage system 200 of FIG. 2 are in a RAID 5 configuration, with the RAID primary data storage devices 206a, 206b, and up to 206b configured to store primary data (e.g., provided by the host system 202), and the RAID parity data storage device 206d configured to store parity data that may be utilized to recover primary data when that primary data becomes unavailable on one of the RAID primary data storage devices 206a-206c.

However, while a few RAID storage devices in a particular configuration are illustrated, one of skill in the art in possession of the present disclosure will recognize that many more storage devices may (and typically will) be coupled to the RAID storage controller device 204 and the host system 202 (e.g., in a datacenter) and may be provided in other RAID configurations while remaining within the scope of the present disclosure. In the embodiments discussed below, the RAID storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
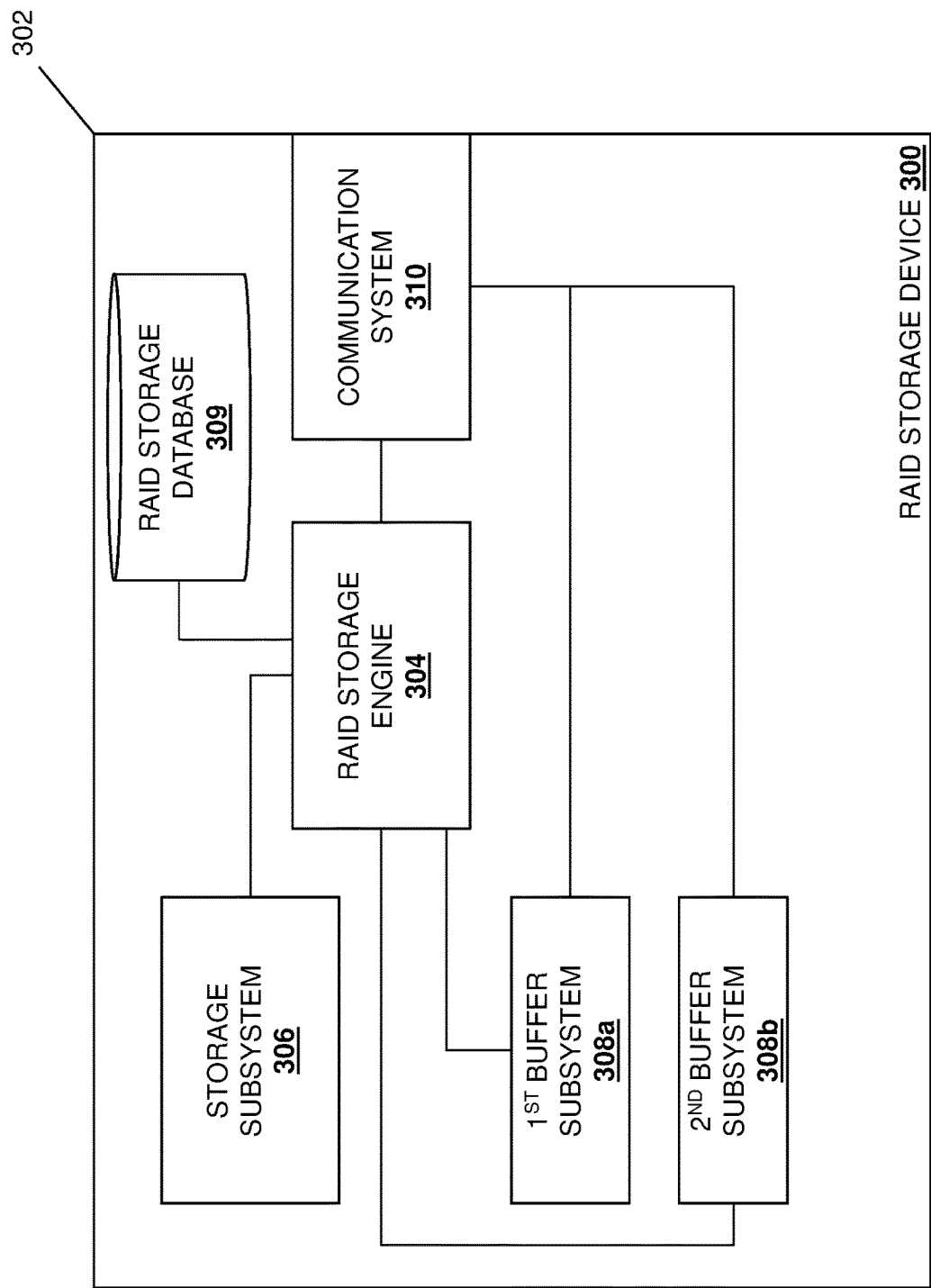
FIG. 3 is a schematic view illustrating an embodiment of a RAID storage device that may be provided in the RAID storage system of FIG. 2.

Referring now to FIG. 3, an embodiment of a RAID storage device 300 is illustrated that may provide any or all of the RAID primary data storage devices 206a-206c and the RAID parity data storage device 206d discussed above with reference to FIG. 2. As such, the RAID storage device 300 may be provided by an NVMe SSD storage device, but one of skill in the art in possession of the present disclosure will recognize that other types of storage devices with similar functionality as the NVMe SSD storage devices (e.g., NVMe PCIe add-in cards, NVMe M.2 cards, etc.) may be provided according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. While not illustrated, one of skill in the art in possession of the present disclosure will recognize that the RAID storage engine 304 may include, or be coupled to, other components such as a queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a buffer system 308 that includes a first buffer subsystem 308a that is coupled to the RAID storage engine 304 (e.g., via a coupling between the first buffer subsystem 308a and the processing system), and a second buffer subsystem 308b that is coupled to the RAID storage engine 304 (e.g., via a coupling between the second buffer subsystem 308b and the processing system). For example, the buffer system 308 may be provided by one or more buffer memory devices that include a first set of memory address ranges that provide the first buffer subsystem 308a, and a second set of memory address ranges that provide the second buffer subsystem 308b. Continuing with the example provided above in which the RAID storage device 300 is an NVMe SSD storage device, the first buffer subsystem 308a may be provided by a portion of the buffer system 308 that is often referred to as the "device buffer". However, one of skill in the art in possession of the present disclosure will recognize that the first buffer subsystem 308a may be provided using other buffer technologies while remaining within the scope of the present disclosure as well.

Similarly, continuing with the example provided above in which the RAID storage device 300 is an NVMe SSD storage device, the second buffer subsystem 308b may be provided by a portion of the buffer system 308 that is often referred to as the "Controller Memory Buffer (CMB)", "scratchpad buffer", or "cache buffer". In an embodiment, the second buffer subsystem 308b/CMB may be provided by a subset of the buffer system 308 that is distinguished from the first buffer subsystem 308a/device buffer. For example, the second set of memory address ranges in the buffer memory device(s) that provide the second buffer subsystem 308b/CMB may be mapped to the PCIe memory space of the host system 202, which one of skill in the art in possession of the present disclosure will recognize makes the second buffer subsystem 308b/CMB visible to the host system 202 while the rest of the buffer system 308 (e.g., the first buffer subsystem 308a/device buffer) is not (i.e., due to the first set of memory address ranges in the buffer memory device(s) that provide the first buffer subsystem 308a/device buffer not being mapping to the PCIe memory space of the host system 202.) As will be appreciated by one of skill in the art in possession of the present disclosure, mapping the second buffer subsystem 308b/CMB to the PCIe memory space of the host system 202 allows for the second buffer subsystem 308b/CMB to be the target of the Direct Memory Access (DMA) data operation discussed below. However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to store any of the information utilized by the RAID storage engine 304 as discussed below.

The chassis 302 may also house a communication system 310 that is coupled to the RAID storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID storage device 300 is an NVMe SSD storage device, the communication system 310 may include any NVMe SSD storage device communication components that enable the Direct Memory Access (DMA) operations described below, the submission and completion queues discussed below, as well as any other components that provide NVMe SDD storage device communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

Figure 4:
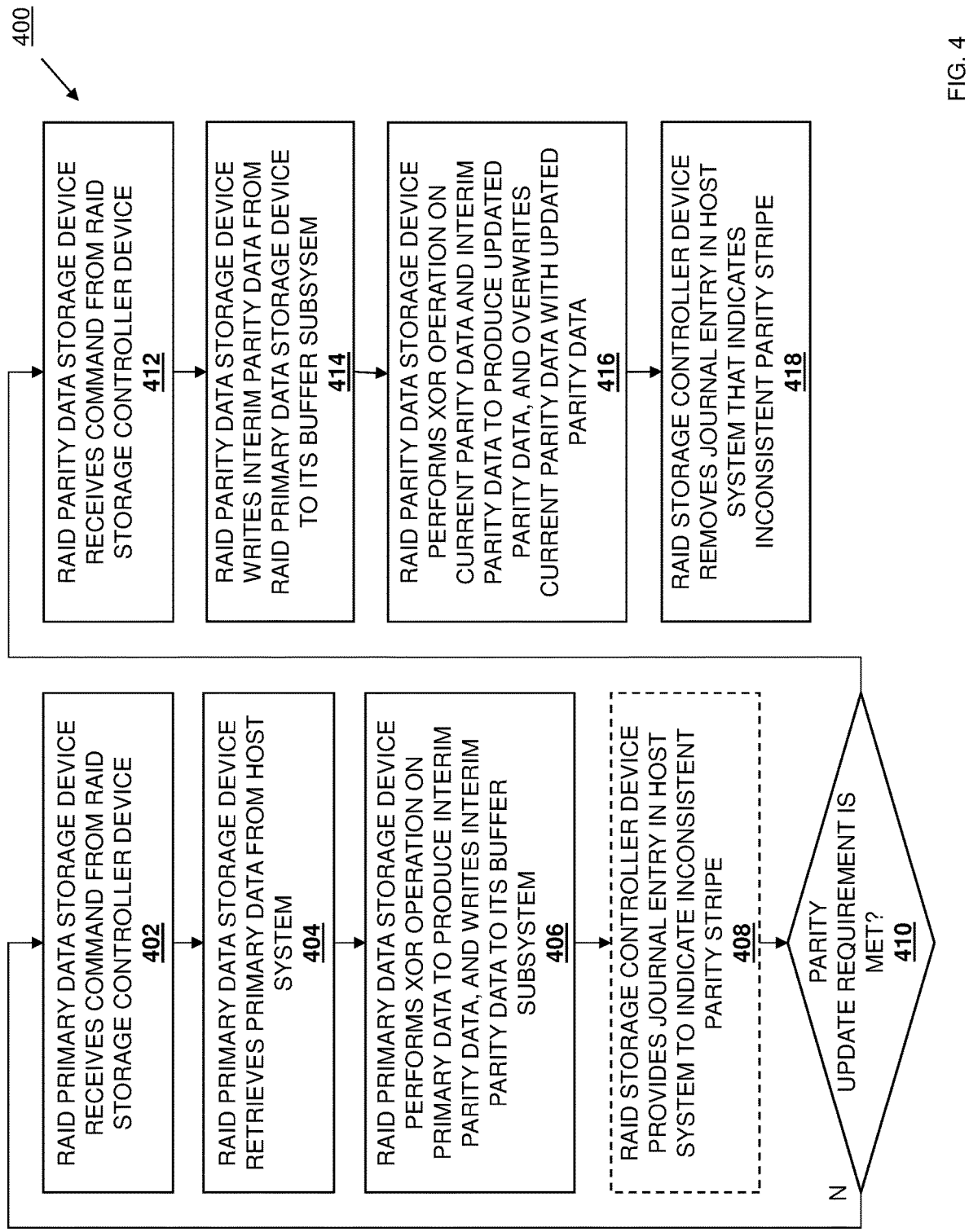
FIG. 4 is a flow chart illustrating an embodiment of a portion of a method for assisting with deferred parity data update operations using RAID storage devices.

Referring now to FIG. 4, an embodiment of a method 400 for assisting with deferred parity data update operations using RAID storage devices is illustrated. As discussed below, the systems and methods of the present disclosure provide for the performance of deferred parity data update operations to backup data in a RAID storage system with the assistance of the RAID storage devices that store that data. For example, a RAID primary data storage device may receive a command from a RAID storage controller device and, in response, may retrieve new primary data from a host system via a first Direct Memory Access (DMA) operation, perform an XOR operation on current primary data in its first storage subsystem and the new primary data to produce interim parity data, write the interim parity data to its first buffer subsystem, and send a completion message to the RAID storage controller device. In response to receiving the completion message, the RAID storage controller device may provide a journal entry in the host system that indicates an inconsistent parity stripe, while the RAID primary data storage device may overwrite the current primary data with the new primary data in its first storage subsystem such that the new primary data becomes current primary data (for the purposes of the discussion below), with the interim parity data becoming current interim parity data (for the purposes of the discussion below.)

Subsequently, as long as a parity update requirement is not met, the RAID primary data storage device may receive subsequent commands from the RAID storage controller device and, in response to each of those subsequent commands, may retrieve new primary data from the host system via a DMA operation, perform an XOR operation on the current primary data in its first storage subsystem, the current interim parity data in its first buffer subsystem, and the new primary data to produce updated interim parity data, write the updated interim parity data to its first buffer subsystem, overwrite the current primary data with the new primary data in its first storage subsystem (with the new primary data becoming current primary data), and send a completion message to the RAID storage controller device. In many cases, the overwriting of the current primary data with the new primary data in its first storage subsystem is to the same storage location in the first storage subsystem such that the RAID storage controller device need not provide or update any journal entry in the host system that indicates an inconsistent parity stripe. However, if the writing or updating of the new primary data in its first storage subsystem is to any different memory location, the RAID storage controller device may provide or update journal entry(ies) in the host system that indicate an inconsistent parity stripe.

Once the parity update requirement is met, the RAID parity data storage device may receive a second command from the RAID storage controller device and, in response, may retrieve the current interim parity data via a DMA operation from the first buffer subsystem in the RAID primary data storage device, perform an XOR operation on current parity data in its second storage subsystem and the current interim parity data to produce updated parity data, overwrite the current parity data with the updated parity data in the second storage subsystem, and send a completion message to the RAID storage controller device. In response to receiving the completion message, the RAID storage controller device may remove the journal entry in the host system that indicates the inconsistent parity stripe. As such, deferred parity update operations are offloaded from the RAID storage controller device, thus increasing the ability of the RAID storage controller device to scale with high performance RAID storage devices.

Figure 5:
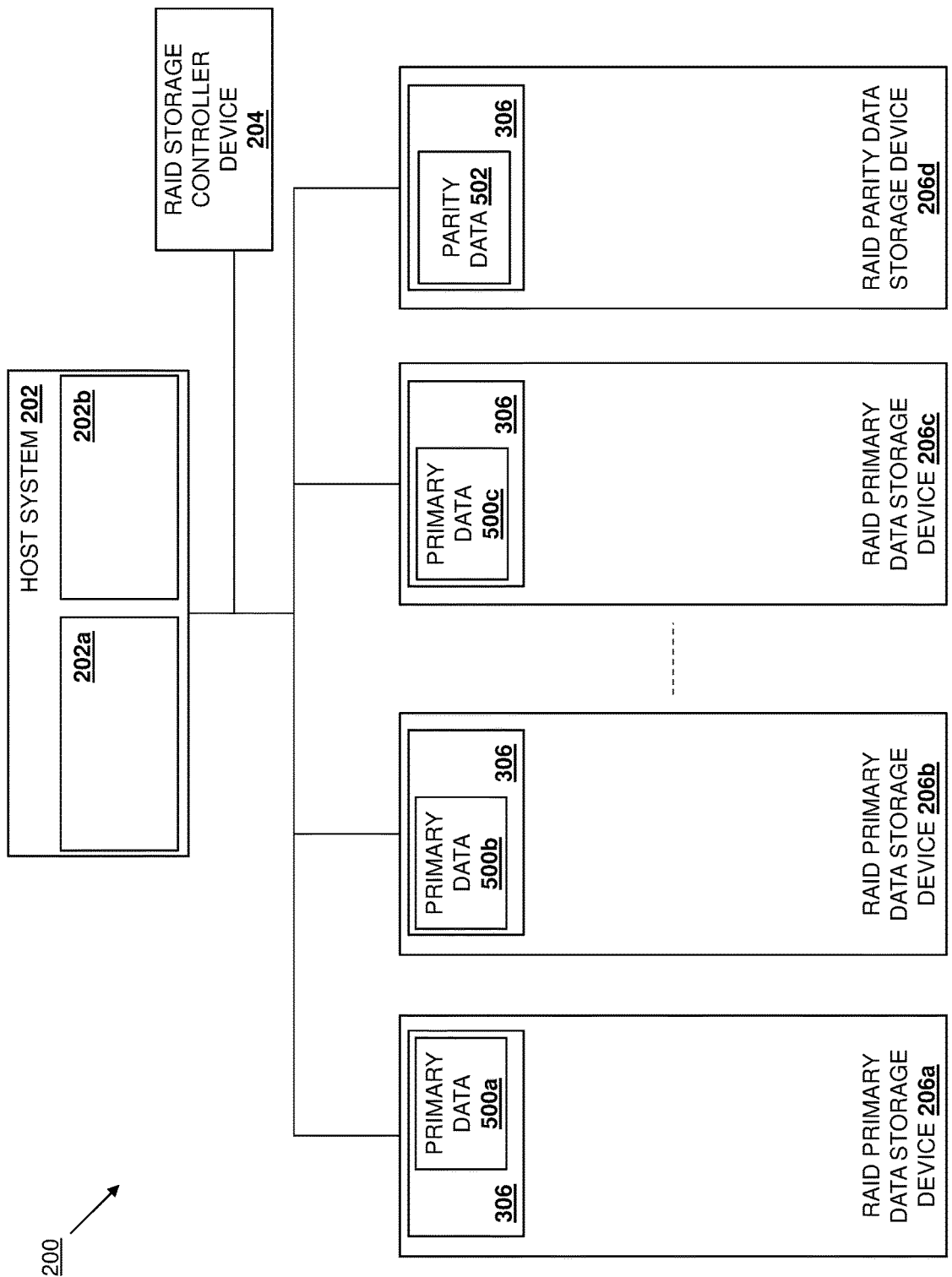
FIG. 5 is a schematic view illustrating an embodiment of the RAID storage system of FIG. 2 operating during the method of FIG. 4.

With reference to FIG. 5, the RAID storage system 200 is illustrated with the RAID primary storage device 206a storing primary data 500a in its storage subsystem 306, the RAID primary storage device 206b storing primary data 500b in its storage subsystem 306, and the RAID primary data storage device 206c storing primary data 500c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206*d* storing parity data 502 in its storage subsystem 306, and one of skill in the art in possession of the present disclosure will recognize that the parity data 502 may have been generated via an XOR operation performed on the primary data 500*a*-500*c* in the RAID primary data storage devices 206*a*-206*c*, respectively, and allows for the rebuilding of any primary data stored on any one RAID primary data storage device in the event that primary data/RAID primary data storage device becomes unavailable.

As will also be appreciated by one of skill in the art in possession of the present disclosure, the primary/parity data storage configuration illustrated in FIG. 5 provides primary/parity data for a single data strip, and different data strips may have different primary/parity data storage configurations (e.g., in a plurality of RAID storage devices provided in a RAID storage system, a first data stripe may include primary data on first, second, and third RAID storage device, and parity data on a fourth RAID storage device; a second data stripe may include primary data on the second, third, and fourth RAID storage devices, and parity data on the first RAID storage device, etc.) As such, while a particular RAID storage system device and data configuration is illustrated for purposes of the examples below, one of skill in the art in possession of the present disclosure will recognize that a variety of device and data configurations will fall within the scope of the present disclosure as well.

Figure 6A:
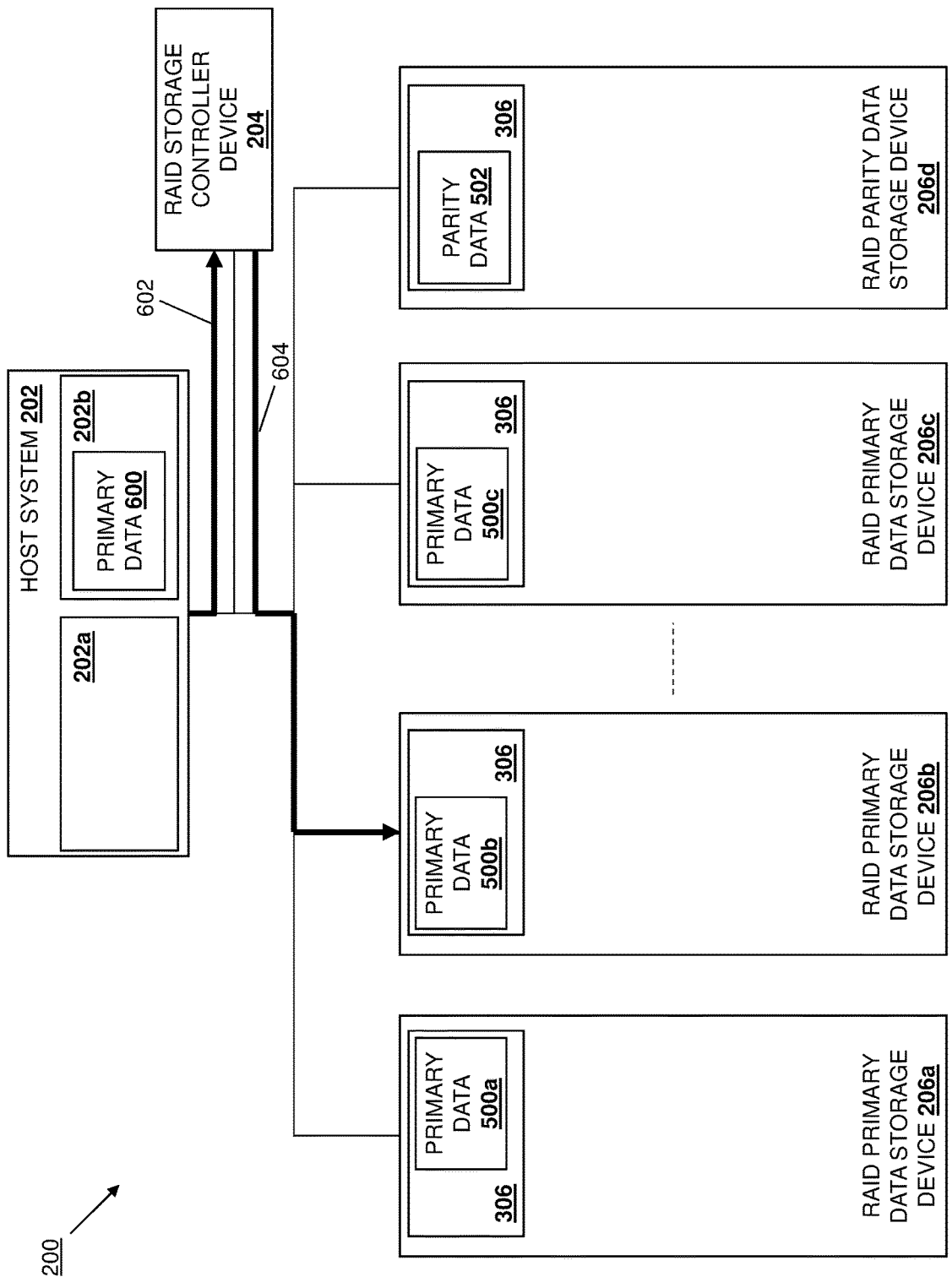
FIG. 6A is a schematic view illustrating an embodiment of the RAID storage system of FIG. 2 operating during the method of FIG. 4.

The method 400 begins at block 402 where a RAID primary data storage device receives a command from a RAID storage controller device. In an embodiment, at block 402, the RAID storage controller device 204 may generate and transmit a command to a RAID primary data storage device. With reference to FIG. 6A, the host system 202 may generate primary data 600 and store that primary data 600 in its host memory subsystem 202*b*. Subsequently, the host system 202 may generate a write command 602 that instructs the writing of the primary data 600 to the RAID primary data storage devices 206*a*-206*c*, and may transmit that write command 602 to the RAID storage controller device 204. As will be appreciated by one of skill in the art in possession of the present disclosure, the generation and/or transmission of the write command 602 by the host system 202 to the RAID storage controller device 204 at block 402 may include a variety of control plane communications between the host system 202 and the RAID storage controller device 204 that have been omitted for clarity of discussion. As such, at block 402, the RAID storage controller device 204 may receive the write command 602 and, in response to that write command 602, may generate a command 604 and transmit the command 604 to the RAID primary data storage device 206*b*.

In some embodiments, the command 604 may be a multi-operation command like those described in U.S. patent application Ser. No. 16/585,296, filed on Sep. 27, 2019. For example, the command 604 may be an NVMe WRITE WITH XOR multi-operation command that is configured to cause the RAID primary data storage device 206*b* to perform the multiple operations described below. However, while described as providing a multi-operation command at block 402, one of skill in the art in possession of the present disclosure will recognize that the multiple operations performed by the RAID primary data storage device 206*b* discussed below may be performed in response to respective commands transmitted by the RAID storage controller device 204 while remaining within the scope of the present disclosure as well. In a specific example, the transmission of the command 604 may include the RAID storage controller device 204 providing the command 604 in a submission queue that is included in the communication system 310 in the RAID primary data storage device 206*b*/300, and then ringing a doorbell for the RAID primary data storage device 206*b*/300. However, one of skill in the art in possession of the present disclosure will recognize that the command 604 may be provided to the RAID primary data storage device 206*b* in a variety of manners that will fall within the scope of the present disclosure as well.

As such, in some examples the RAID storage engine 304 in the RAID primary data storage device 206*b*/300 may respond to the ringing of its doorbell by accessing the command 604 in the submission queue in its communication system 310. In embodiments in which the command 604 is a multi-operation command, the RAID storage engine 304 in the RAID primary data storage device 206*b*/300 may identify the multiple operations instructed by that command 604 (as described in U.S. patent application Ser. No. 16/585,296, filed on Sep. 27, 2019.) However, while a single RAID primary data storage device is illustrated and described below as receiving the command 604 that causes it to update its primary data 500*b*, one of skill in the art in possession of the present disclosure will recognize how multiple RAID primary storage devices may receive similar commands at block 402 while remaining within the scope of the present disclosure as well.

Figure 6B:
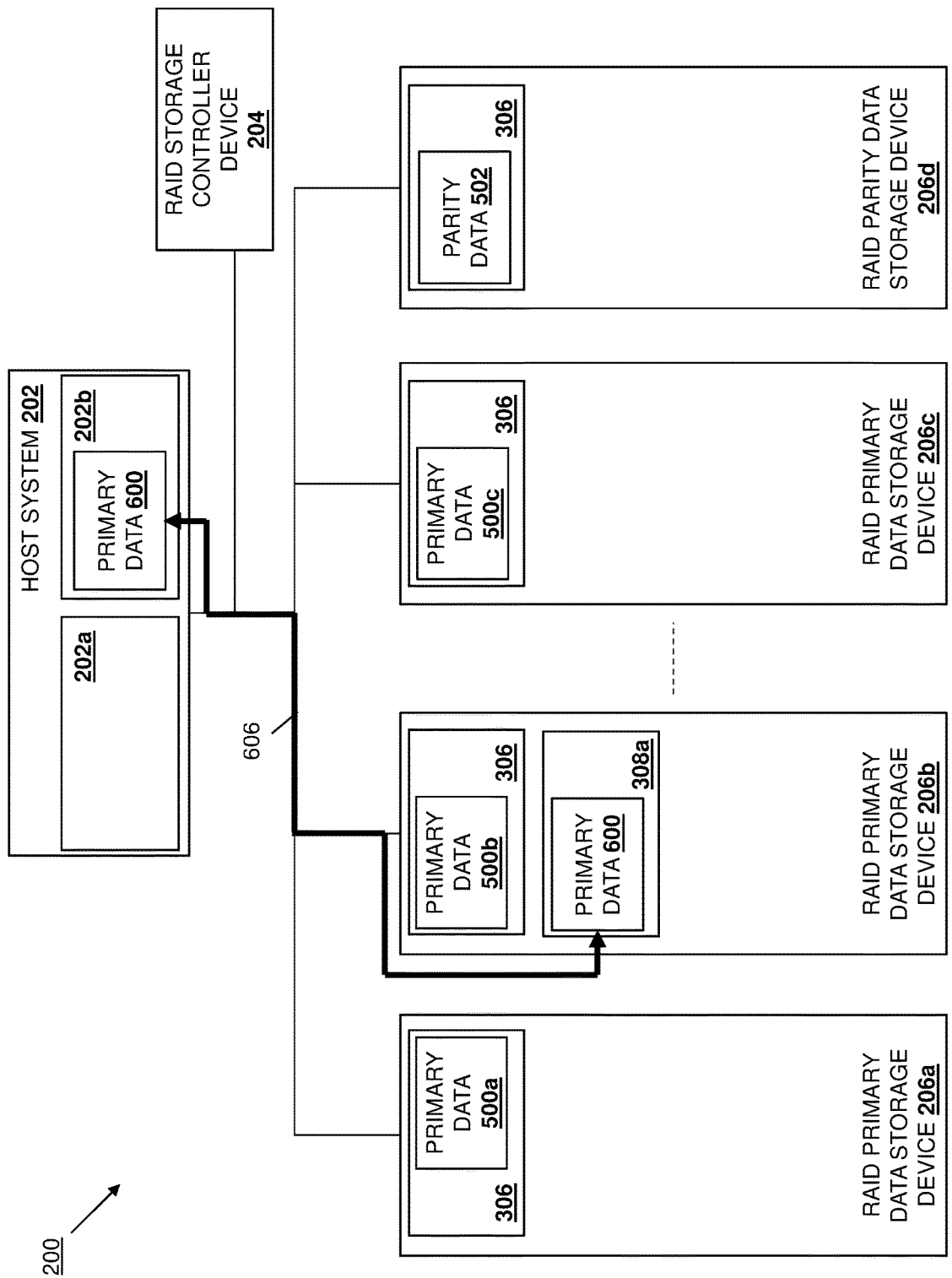
FIG. 6B is a schematic view illustrating an embodiment of the RAID storage system of FIG. 2 operating during the method of FIG. 4.

The method 400 then proceeds to block 404 where the RAID primary data storage device retrieves primary data from a host system. With reference to FIG. 6B, in an embodiment of block 404 and based on the command 604 (which is a multi-operation command as described above in this embodiment), the RAID storage engine 304 in the RAID primary data storage device 206*b*/300 may operate to perform a Direct Memory Access (DMA) operation 606 that accesses the primary data 600 that is stored on the host memory subsystem 202*b* in the host system 202, and writes that primary data 600 to its first buffer subsystem 308*a* (e.g., in a device buffer in the RAID primary data storage device 206*b* as described in the example above). As will be appreciated by one of skill in the art in possession of the present disclosure, the primary data 600 may be an update to the primary data 500*b* stored in the storage subsystem 306 in the RAID primary data storage device 206*b*, although other primary data writing scenarios will fall within the scope of the present disclosure as well.

Figure 6C:
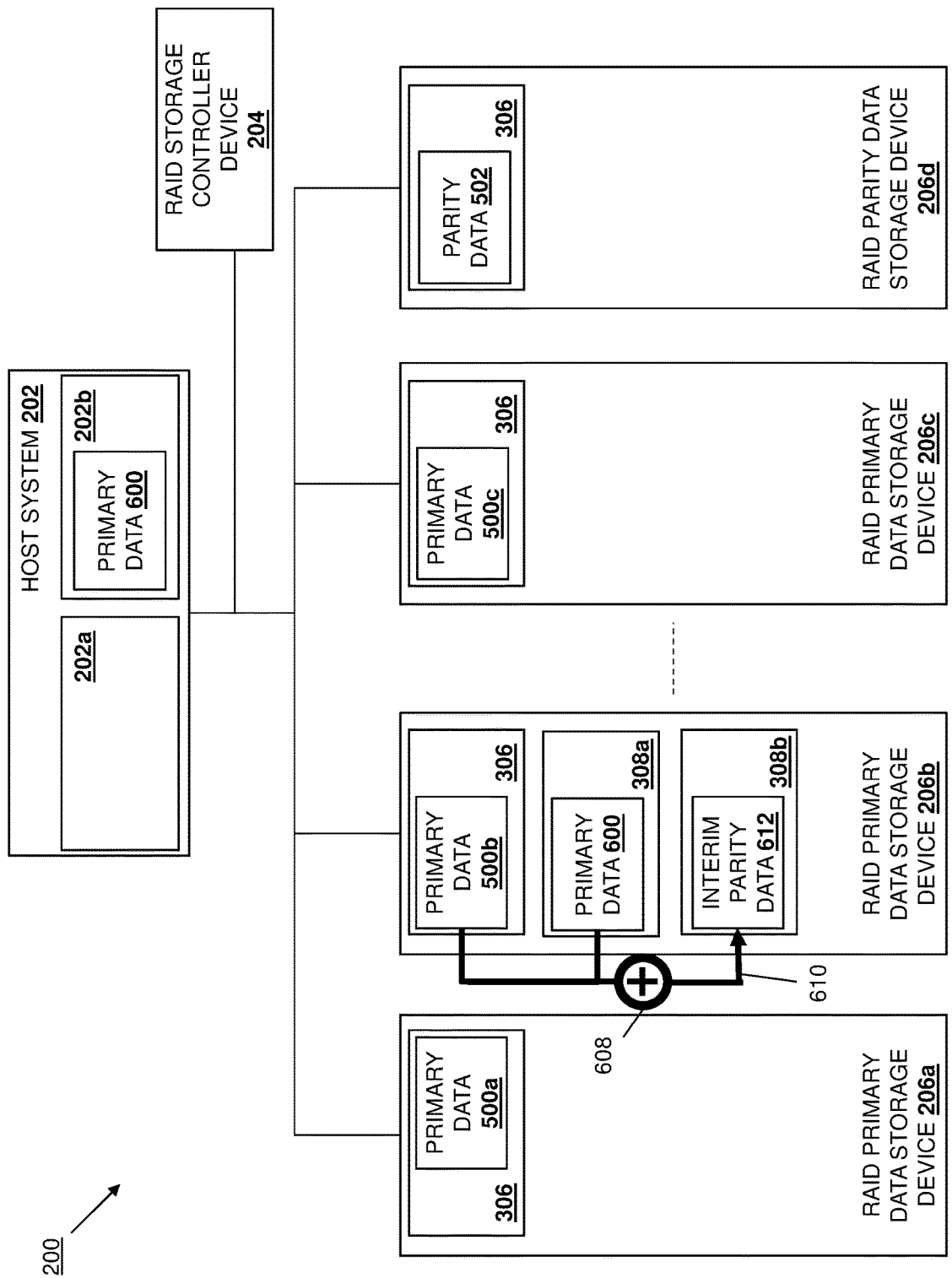
FIG. 6C is a schematic view illustrating an embodiment of the RAID storage system of FIG. 2 operating during the method of FIG. 4.

The method 400 then proceeds to block 406 where the RAID primary data storage device performs XOR operations on primary data to produce interim parity data, and writes the interim parity data to its buffer subsystem. With reference to FIG. 6C, in an embodiment of block 406 and based on the command 604 (which is a multi-operation command as described above in this embodiment), the RAID storage engine 304 in the RAID primary data storage device 206*b*/300 may operate to perform an XOR operation 608 using the primary data 500*b* in its storage subsystem 306 and the primary data 600 in its first buffer subsystem 308*a* in order to produce interim parity data 612, and then writes that interim parity data 612 to its second buffer subsystem 308*b* (e.g., a CMB). For example, the command 604 may identify a target Logical Block Address (LBA) identifier for the storage location of the primary data 500b in the storage subsystem 306 in the RAID primary data storage device 206b as the location to which the primary data 600 should be written, and thus the RAID engine 304 in the RAID primary data storage device 206b may perform the XOR operation 608 on that primary data 500b and the primary data 600.

Figure 6D:
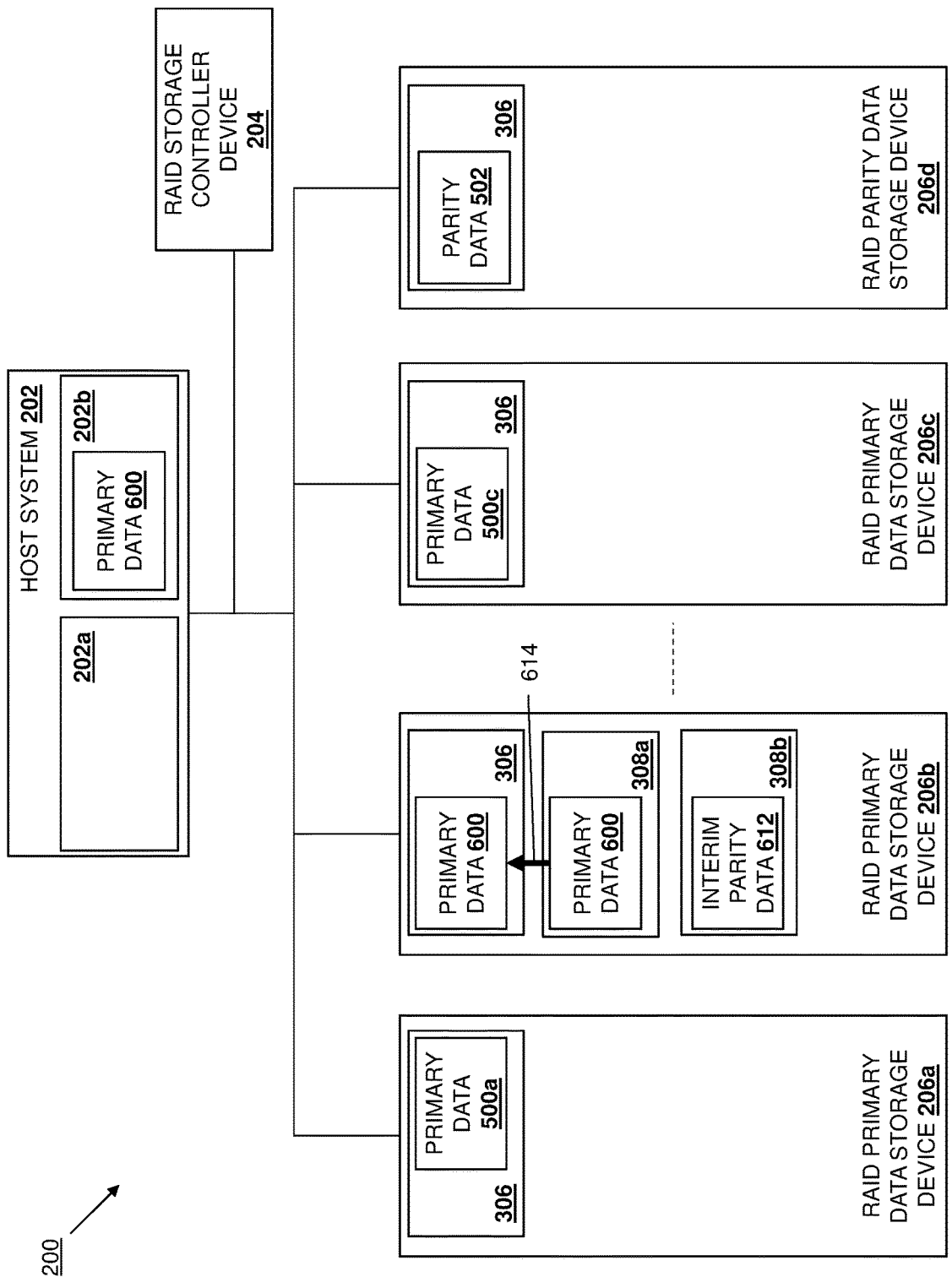
FIG. 6D is a schematic view illustrating an embodiment of the RAID storage system of FIG. 2 operating during the method of FIG. 4.

With reference to FIG. 6D, the RAID storage engine 304 in the RAID parity data storage device 206b may perform an overwrite operation 614 to overwrite the primary data 500b in its storage subsystem 306 with the primary data 600 in its first buffer subsystem 308a based on the command 604 (which is a multi-operation command as described above in this embodiment that identifies the target LBA identifier for the storage location of the primary data 500b in the storage subsystem 306 in the RAID primary data storage device 206b), thus updating that primary data stored by the RAID primary data storage device 206b. One of skill in the art in possession of the present disclosure will recognize how RAID primary data storage devices experiencing similar primary data updates may perform similar primary data overwriting operations while remaining within the scope of the present disclosure as well.

Figure 6E:
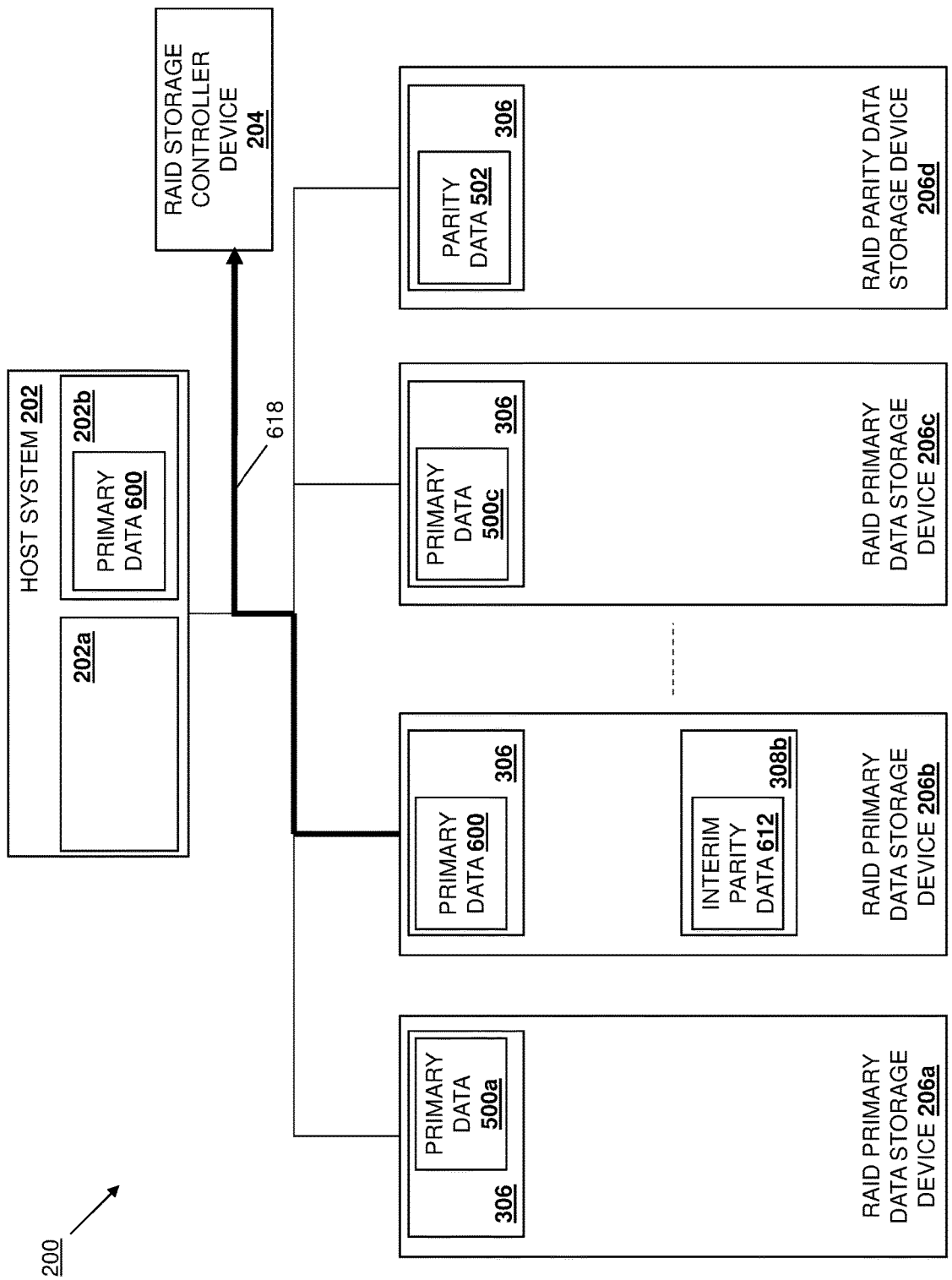
FIG. 6E is a schematic view illustrating an embodiment of the RAID storage system of FIG. 2 operating during the method of FIG. 4.

With reference to FIG. 6E, following completion of the operations associated with the command 604 (e.g., multiple operations associated with a multi-operation command as discussed above, following each operation associated with respective commands, etc.) the RAID storage engine 304 in the RAID primary data storage device 206b/300 may generate and transmit a completion message 618 to the RAID storage controller device 204. For example, the RAID storage engine 304 in the RAID primary data storage device 206b/300 may generate the completion message 618 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. Furthermore, one of skill in the art in possession of the present disclosure will recognize that other RAID primary data storage devices experiencing similar primary data updates (as discussed above) may transmit similar completion messages to the RAID storage controller device 204 following their update operations (e.g., the multiple operations in the WRITE WITH XOR multi-operation command discussed above).

Figure 7A:
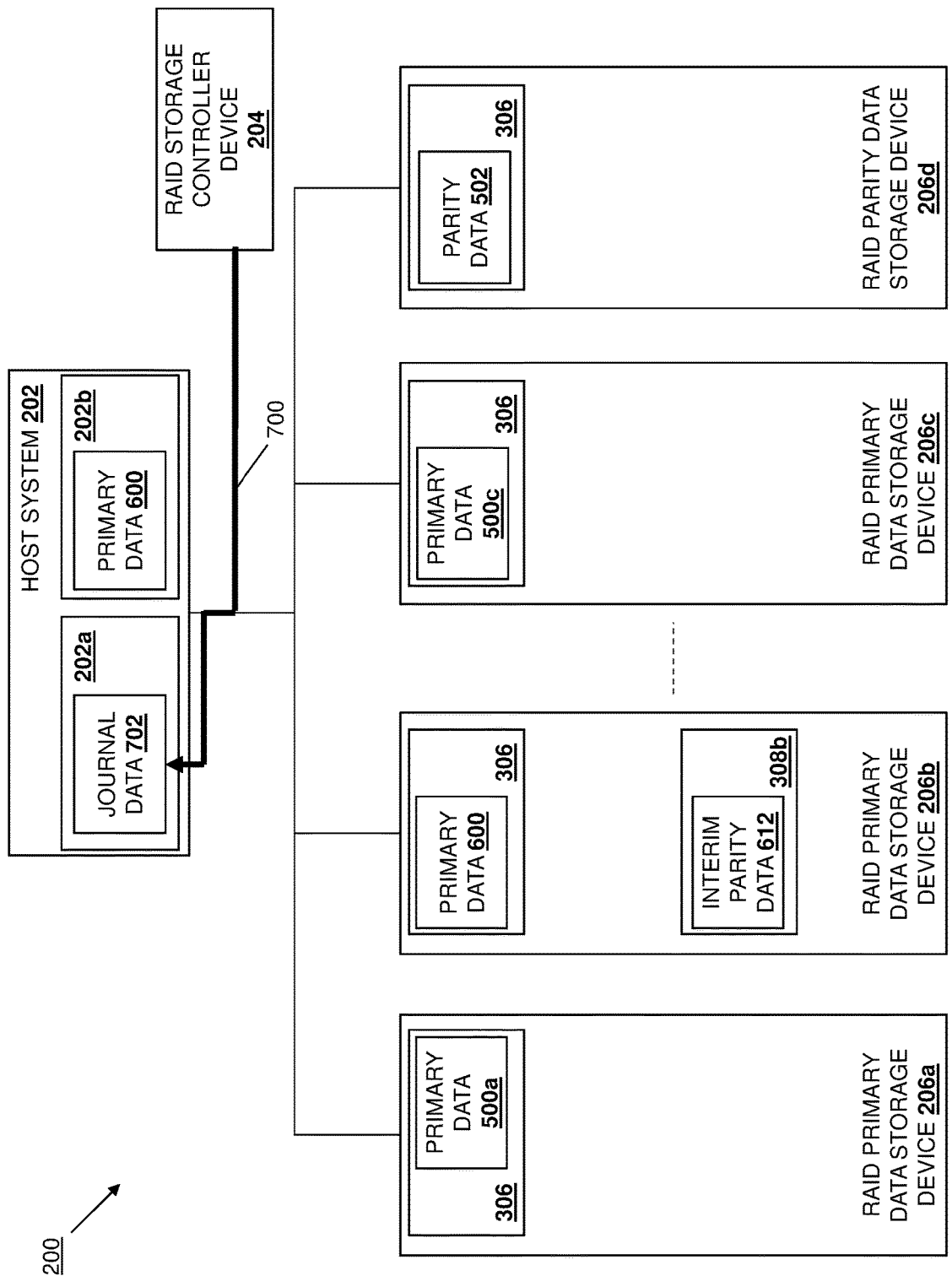
FIG. 7A is a schematic view illustrating an embodiment of the RAID storage system of FIG. 2 operating during the method of FIG. 4.
Figure 7B:
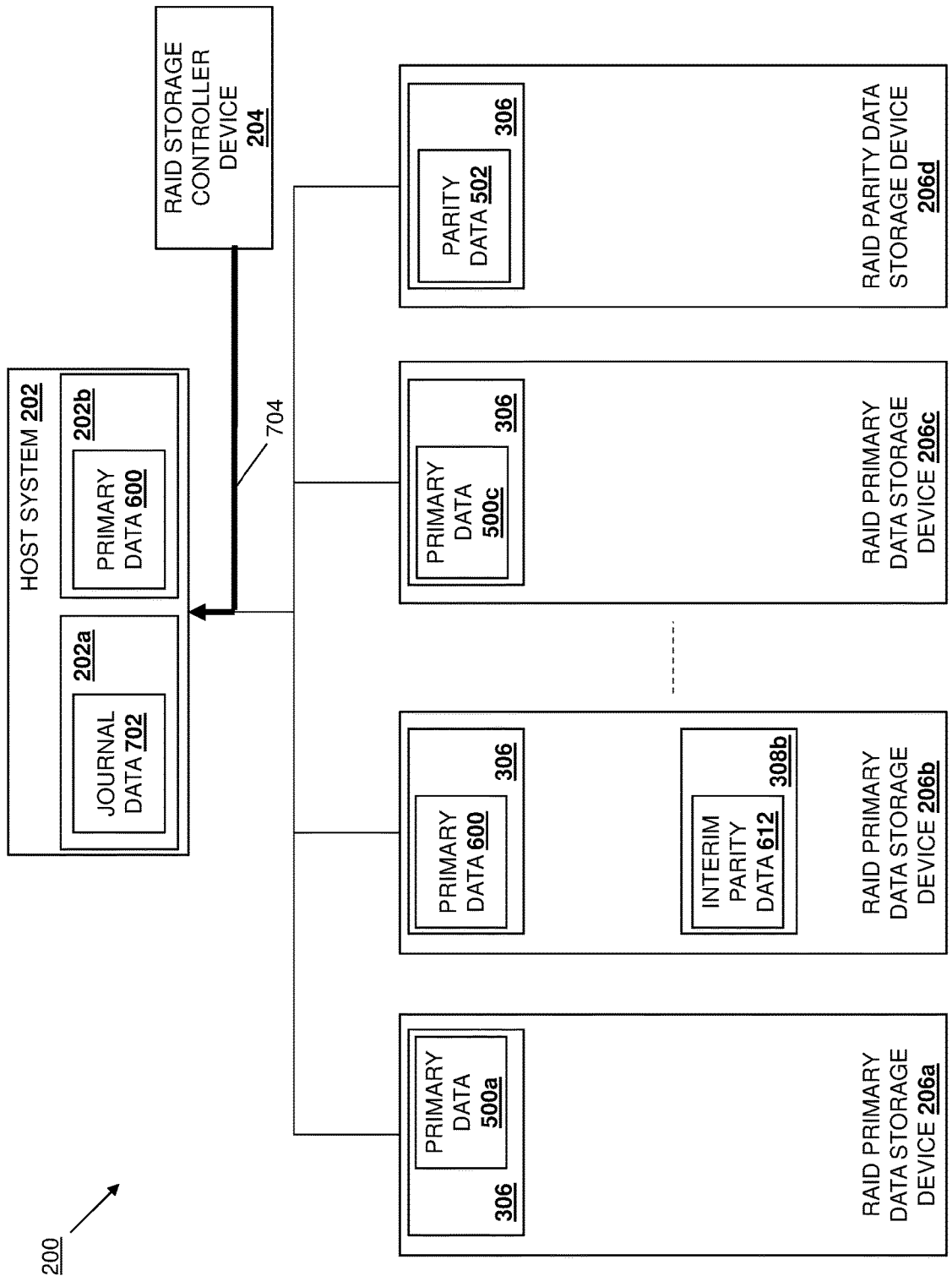
FIG. 7B is a schematic view illustrating an embodiment of the RAID storage system of FIG. 2 operating during the method of FIG. 4.

The method 400 may then proceed to optional block 408 where the RAID storage controller device may provide a journal entry in the host system to indicate an inconsistent parity stripe. For example, with reference to FIG. 7A and as discussed above, the RAID storage controller device 204 may determine that completion messages from the RAID primary data storage device 206b that experienced the primary data update has been received and, in response, at optional block 408 the RAID storage controller device 204 may perform an inconsistent parity stripe journal entry operation 700 that operates to provide journal data 702 in the storage subsystem 202a (e.g., an NVDIMM memory device) under control of the host system 202. As will be appreciated by one of skill in the art in possession of the present disclosure, the updating of the primary data on the RAID primary data storage device 206b (e.g., overwriting the primary data 500b with the primary data 600 in the storage subsystem 306 as discussed above) without the updating of the parity data 502 on the storage subsystem 306 in the RAID parity data storage device 206d provides an "inconsistent parity stripe" for the data stripe that includes primary data 500a, 600, and up to 500c, as the parity data 502 was generated for the primary data 500a, 500b, and up to 500c, and thus cannot be used to rebuild any of the primary data 500a, 600, and up to 500c in the event it becomes unavailable.

However, as discussed below, the determination and storage of the interim parity data 612 allows for the updating of the parity data 502 stored in the storage subsystem 306 in the RAID parity data storage device 206d to be deferred, and the journal data 702 provided in the storage subsystem 202a of the host system 202 allows for data recovery from a failure (e.g., a power loss to the RAID storage system 200) that occurs prior to the updating of the parity data 502 stored in the storage subsystem 306 in the RAID parity data storage device 206d. As would be appreciated by one of skill in the art in possession of the present disclosure, the journal data 702 provides "insurance" for deferring the update of the parity data 502 by recording the data stripes that have been modified without an associated parity data update so that in the case of a power loss or other RAID storage system failure, the parity data can be recalculated. As will be appreciated by one of skill in the art in possession of the present disclosure, the journal may document whether the stripe is inconsistent (and in some cases to more granular level than the stripe), as well as the most recent written data which is not yet represented as consistent parity in the parity stripe (unless the risk that no drive loss will happen during the deferred parity update time is deemed acceptable by an administrator.)

The deferred parity data updates of the present disclosure may be particularly beneficial in situations where an application (e.g., running on the host system 202) repeatedly writes and/or updates data in the same storage location (e.g., the same location in the storage subsystem 306 in the RAID primary data storage device 206b, i.e., the same NAND flash memory device location(s)). For example, as will be appreciated by one of skill in the art in possession of the present disclosure, the journal data 702 may indicate an inconsistent parity stripe for a particular storage location and, as such, once the journal data 702 is provided in the storage subsystem 202a in the host system 202, subsequent changes to the primary data at that same storage location in the storage subsystem 306 in the RAID primary data storage device 206b do not require changes, updates, and/or modifications to that journal data 702/journal entry. Thus, optional block 408 may not be performed in situations in which the primary data updates that occur on subsequent iterations of the method 400 are provided in the same storage locations. However, as discussed below, optional block 408 may be performed any time a new storage location is used to write/update primary data stored in the RAID primary data storage device(s).

Following the writing of the journal data 702 to the storage subsystem 202a in the host system 202, the RAID storage controller device 204 may generate and transmit a completion message 704 to the host system 202. As will be appreciated by one of skill in the art in possession of the present disclosure, the completion message 704 may indicate to the host system 202 that the write command 602 to write the primary data 600 to the RAID primary data storage devices 206a-206c has been performed, and in some situations may indicate that the primary data 600 has been backed up (e.g., by indicating that the parity data 502 has been updated (even though it actually has not), by indicating that the interim parity data 612 and the journal data 702 have been generated and stored, etc.) As such, following operation block 408, the host system 202 may assume that the write operation associated with the write command 602 is completed, and may operate to generate and request storage of additional primary data I the RAID primary data storage devices 206a-206c, discussed in further detail below.

The method 400 then proceeds to decision block 410 where it is determined whether a parity update requirement has been met. In an embodiment, the RAID storage controller device 204 may operate at decision block 410 to determine whether a requirement for updating the parity data 502 in the storage subsystem 306 of the RAID parity data storage device 206d has been met. As will be appreciated by one of skill in the art in possession of the present disclosure, the deferral of parity updates is accompanied by some risk of primary data loss, and that risk grows the longer the update of the parity data is deferred. As such, a RAID storage system administrator may define any of a variety of parity update requirements that may be met to trigger an update of parity data. In some embodiments, the parity update requirement may be associated with a time period after which the parity data 502 must be updated. For example, the RAID storage controller device 204 may begin a timer after sending the command 604 that causes the RAID primary data storage device 206b to generate and store the interim parity data 612, and the parity update requirement may be met when that timer indicates that the defined time period has passed. In other embodiments, the parity update requirement may be associated with a number of times interim parity data is updated in the RAID primary data storage device 206b, after which the parity data 502 must be updated. For example, the RAID storage controller device 204 may track the generation and storage of interim parity data by the RAID primary data storage device 206b, and the parity update requirement may be met when that interim parity data has been updated the defined number of times. However, while a few examples have been described, one of skill in the art in possession of the present disclosure will recognize that any of a variety of parity update requirements, or combinations of parity update requirements, may be utilized at decision block 410 while remaining within the scope of the present disclosure as well.

If, at decision block 410, the RAID storage controller device 204 determines that the parity update requirement has not been met, the method 400 returns to block 402 to repeat substantially as described above. For the purposes of the example provided below, that second iteration of blocks 402-410 of the method 400 is described below, but one of skill in the art in possession of the present disclosure will recognize that any number of iterations of blocks 402-410 of the method 400 may be performed before the parity update requirement is met.

Figure 8A:
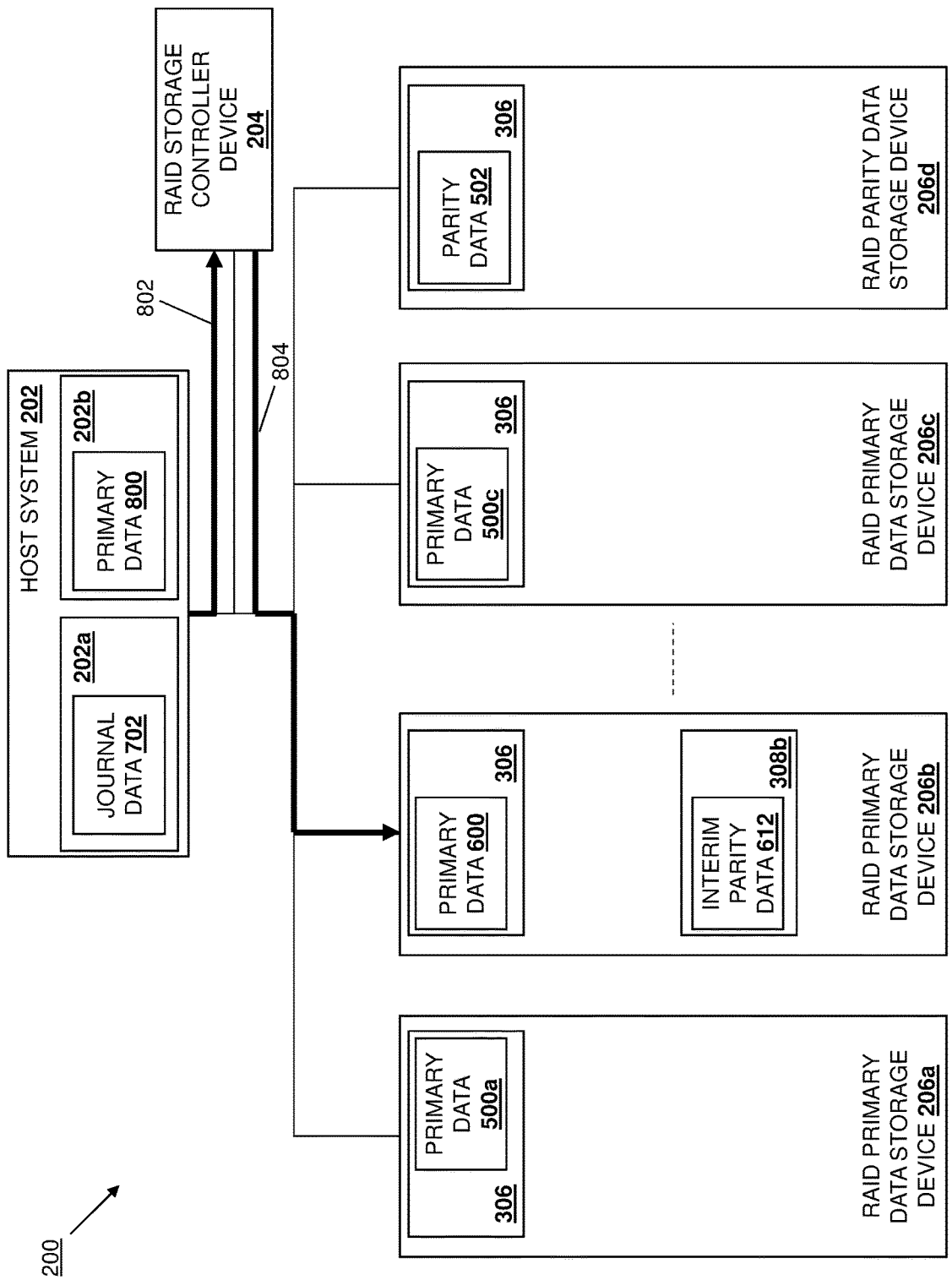
FIG. 8A is a schematic view illustrating an embodiment of the RAID storage system of FIG. 2 operating during the method of FIG. 4.

As illustrated in FIG. 8A, at the second iteration of block 402, the host system 202 may generate primary data 800 and store that primary data 800 in its host memory subsystem 202b. Subsequently, the host system 202 may generate a write command 802 that instructs the writing of the primary data 800 to the RAID primary data storage devices 206a-206c, and may transmit that write command 802 to the RAID storage controller device 204. As will be appreciated by one of skill in the art in possession of the present disclosure, the generation and/or transmission of the write command 802 by the host system 202 to the RAID storage controller device 204 at the second iteration of block 402 may include a variety of control plane communications between the host system 202 and the RAID storage controller device 204 that have been omitted for clarity of discussion. As such, at the second iteration of block 402, the RAID storage controller device 204 may receive the write command 802 and, in response to that write command 802, may generate a command 804 and transmit the command 804 to the RAID primary data storage device 206b.

In some embodiments, the command 804 may be a multi-operation command like those described in U.S. patent application Ser. No. 16/585,296, filed on Sep. 27, 2019. For example, the command 804 may be an NVMe WRITE WITH XOR multi-operation command that is configured to cause the RAID primary data storage device 206b to perform the multiple operations described below.

However, while described as providing a multi-operation command at the second iteration of block 402, one of skill in the art in possession of the present disclosure will recognize that the multiple operations performed by the RAID primary data storage device 206b discussed below may be performed in response to respective commands transmitted by the RAID storage controller device 204 while remaining within the scope of the present disclosure as well. In a specific example, the transmission of the command 804 may include the RAID storage controller device 204 providing the command 804 in a submission queue that is included in the communication system 310 in the RAID primary data storage device 206b/300, and then ringing a doorbell for the RAID primary data storage device 206b/300. However, one of skill in the art in possession of the present disclosure will recognize that the command 804 may be provided to the RAID primary data storage device 206b in a variety of manners that will fall within the scope of the present disclosure as well.

As such, in some examples the RAID storage engine 304 in the RAID primary data storage device 206b/300 may respond to the ringing of its doorbell by accessing the command 804 in the submission queue in its communication system 310. In embodiments in which the command 804 is a multi-operation command, the RAID storage engine 304 in the RAID primary data storage device 206b/300 may identify the multiple operations instructed by that command 804 (as described in U.S. patent application Ser. No. 16/585,296, filed on Sep. 27, 2019.) However, while a single RAID primary data storage device is illustrated and described below as receiving the command 804 that causes it to update its primary data 600, one of skill in the art in possession of the present disclosure will recognize how multiple RAID primary storage devices may receive similar commands at the second iteration of block 402 while remaining within the scope of the present disclosure as well.

Figure 8B:
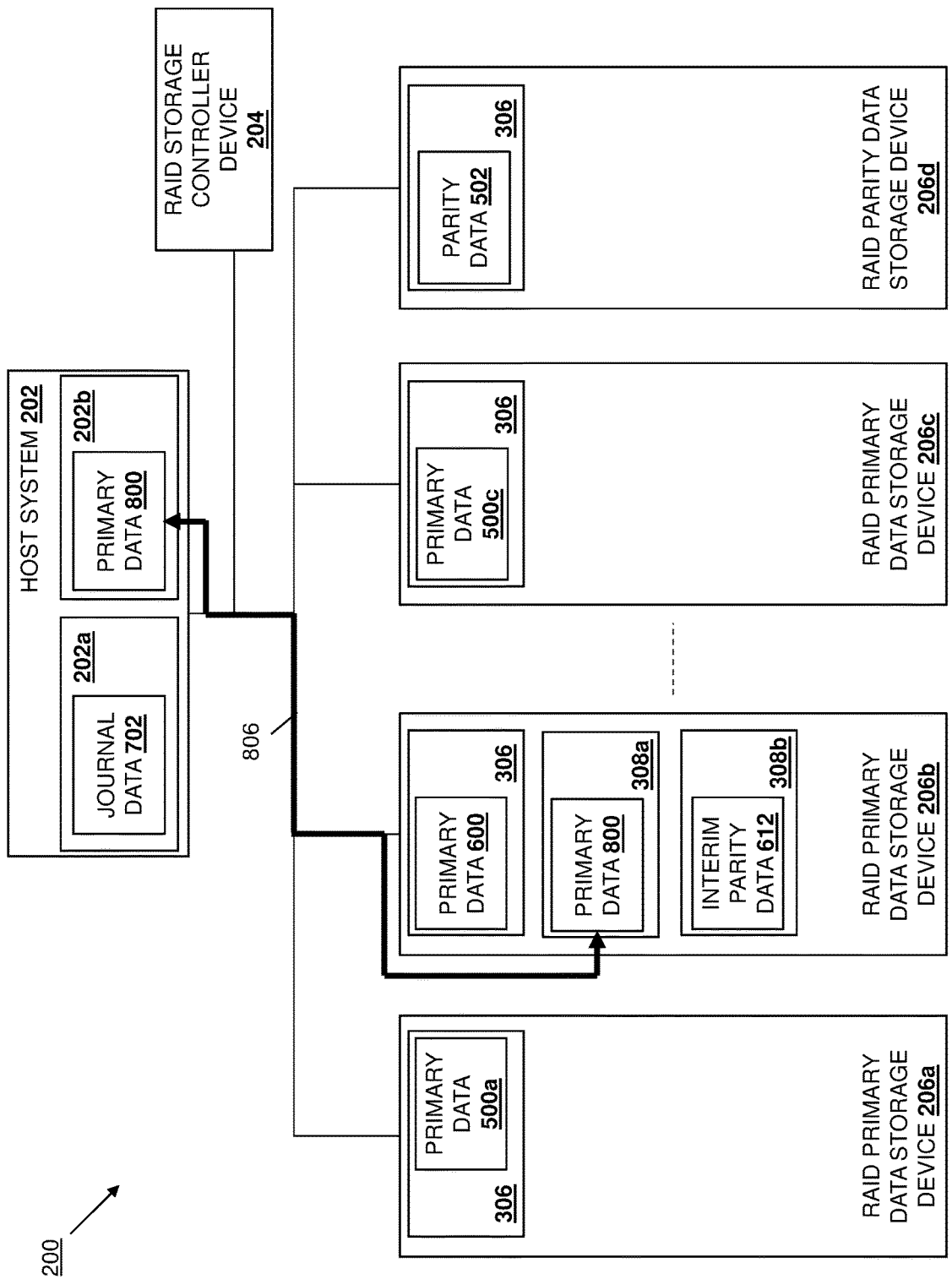
FIG. 8B is a schematic view illustrating an embodiment of the RAID storage system of FIG. 2 operating during the method of FIG. 4.

The method 400 then proceeds to the second iteration of block 404 where the RAID primary data storage device retrieves primary data from a host system. With reference to FIG. 8B, in an embodiment of the second iteration of block 404 and based on the command 804 (which is a multi-operation command as described above in this embodiment), the RAID storage engine 304 in the RAID primary data storage device 206b/300 may operate to perform a Direct Memory Access (DMA) operation 806 that accesses the primary data 800 that is stored on the host memory subsystem 202b in the host system 202, and writes that primary data 800 to its first buffer subsystem 308a (e.g., in a device buffer in the RAID primary data storage device 206b as described in the example above). As will be appreciated by one of skill in the art in possession of the present disclosure, the primary data 800 may be an update to the primary data 600 stored in the storage subsystem 306 in the RAID primary data storage device 206b, although other primary data writing scenarios will fall within the scope of the present disclosure as well.

Figure 8C:
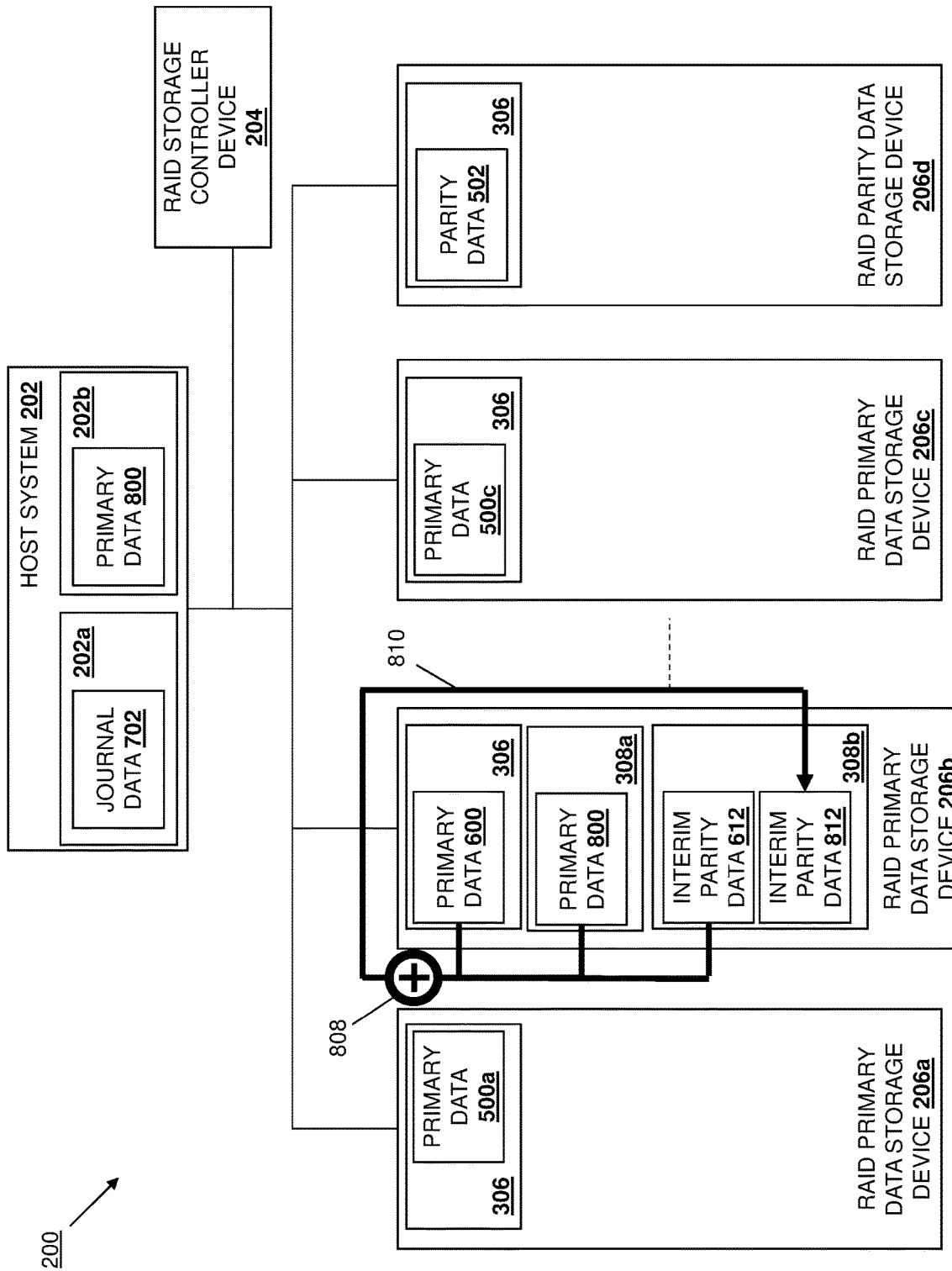
FIG. 8C is a schematic view illustrating an embodiment of the RAID storage system of FIG. 2 operating during the method of FIG. 4.

The method 400 then proceeds to the second iteration of block 406 where the RAID primary data storage device performs XOR operations on primary data and current interim parity data to produce new interim parity data, and writes the new interim parity data to its buffer subsystem. With reference to FIG. 8C, in an embodiment of the second iteration of block 406 and based on the command 804 (which is a multi-operation command as described above in this embodiment), the RAID storage engine 304 in the RAID primary data storage device 206b/300 may operate to perform an XOR operation 808 using the primary data 600 in its storage subsystem 306, the primary data 800 in its first buffer subsystem 308a, and the "current" interim parity data 612 in order to produce "updated" interim parity data 812, and then writes that interim parity data 812 to its second buffer subsystem 308b (e.g., a CMB). For example, the command 804 may identify a target LBA identifier for the storage location of the primary data 600 in the storage subsystem 306 in the RAID primary data storage device 206b as the location to which the primary data 800 should be written, and thus the RAID engine 304 in the RAID primary data storage device 206b may perform the XOR operation 806 on that primary data 600, along with the primary data 800 and the interim parity data 612.)

As will be appreciated by one of skill in the art in possession of the present disclosure, the calculation of updated interim parity requires the current primary data (e.g., the primary data 600 in this example), the new primary data (e.g., the primary data 800 in this example), and the current interim parity data (e.g., the interim parity data 612 in this example). As such, a third iteration of the method 400 would utilize the primary data 800 (e.g., which overwrites the primary data 600 as discussed below), the interim parity data 812, and the new primary data retrieved from the host system 202 in that third iteration of the method 400. As such, in some embodiments, following the determination and storage of the new interim parity data in subsequent iterations of the method 400 (e.g., the interim parity data 812 in this example), the current interim parity data (e.g., the interim parity data 612 in this example) may be discarded from the second buffer subsystem in the RAID primary data storage device.

Figure 8D:
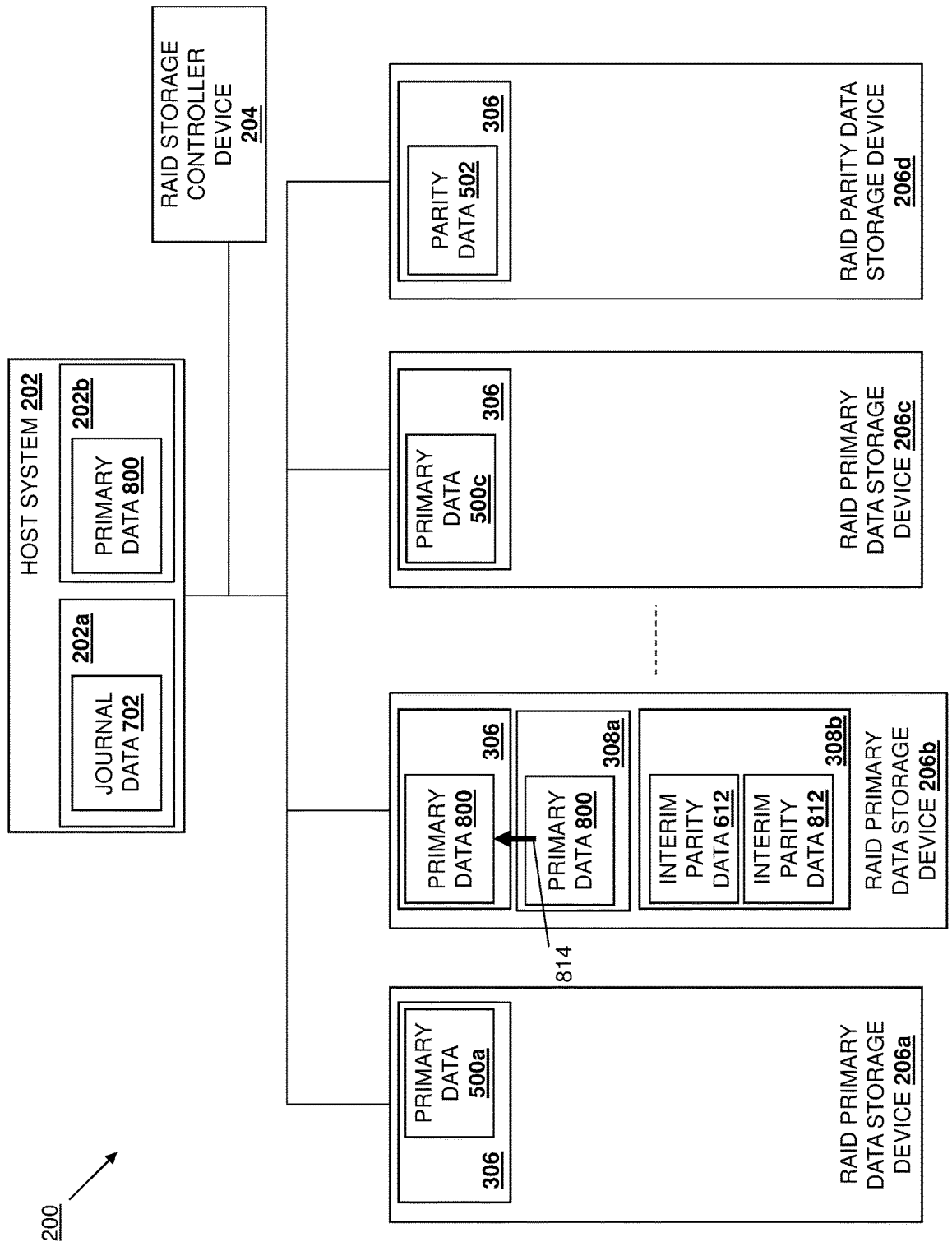
FIG. 8D is a schematic view illustrating an embodiment of the RAID storage system of FIG. 2 operating during the method of FIG. 4.

With reference to FIG. 8D, the RAID storage engine 304 in the RAID parity data storage device 206b may perform an overwrite operation 814 to overwrite the primary data 600 in its storage subsystem 306 with the primary data 800 in its first buffer subsystem 308a based on the command 804 (which is a multi-operation command as described above in this embodiment that identifies the target LBA identifier for the storage location of the primary data 600 in the storage subsystem 306 in the RAID primary data storage device 206b), thus updating that primary data stored by the RAID primary data storage device 206b. One of skill in the art in possession of the present disclosure will recognize how RAID primary data storage devices experiencing similar primary data updates may perform similar primary data overwriting operations while remaining within the scope of the present disclosure as well.

Figure 8E:
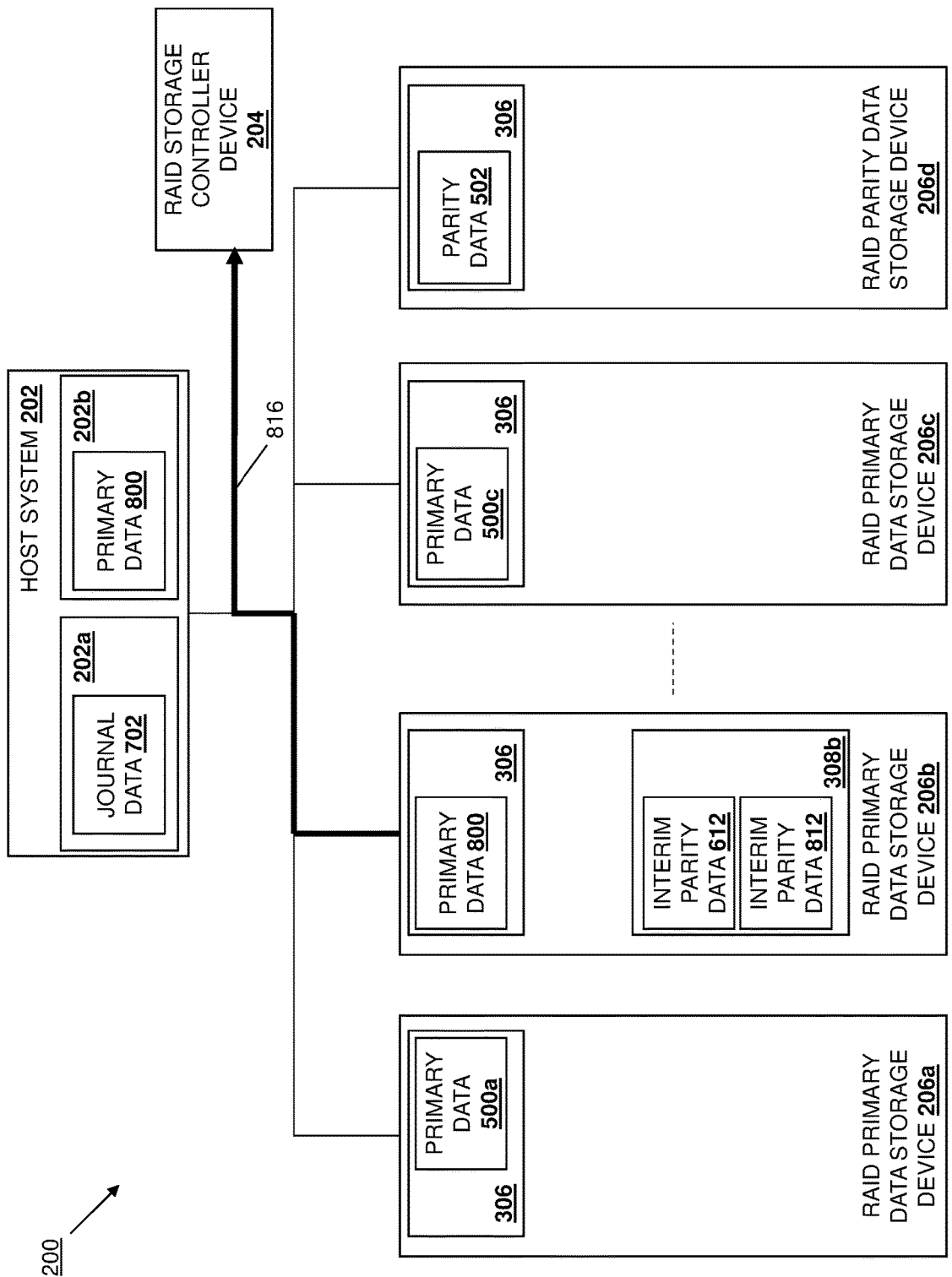
FIG. 8E is a schematic view illustrating an embodiment of the RAID storage system of FIG. 2 operating during the method of FIG. 4.

With reference to FIG. 8E, following completion of the operations associated with the command 804 (e.g., multiple operations associated with a multi-operation command as discussed above, following each operation associated with respective commands, etc.) the RAID storage engine 304 in the RAID primary data storage device 206b/300 may generate and transmit a completion message 816 to the RAID storage controller device 204. For example, the RAID storage engine 304 in the RAID primary data storage device 206b/300 may generate the completion message 816 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. Furthermore, one of skill in the art in possession of the present disclosure will recognize that other RAID primary data storage devices experiencing similar primary data updates (as discussed above) may transmit similar completion messages to the RAID storage controller device 204 following their update operations (e.g., the multiple operations in the WRITE WITH XOR multi-operation command discussed above).

The method 400 may then proceed to the second iteration of optional block 408 where the RAID storage controller device may provide a journal entry in the host system to indicate an inconsistent parity stripe. Similarly as discussed above, the updating of the primary data on the RAID primary data storage device 206b (e.g., overwriting the primary data 600 with the primary data 800 in the storage subsystem 306 on the RAID primary data storage device 206b as discussed above) without the updating of the parity data 502 on the storage subsystem 306 in the RAID parity data storage device 206d continues to result in an "inconsistent parity stripe" for the data stripe that includes primary data 500a, 800, and up to 500c, as the parity data 502 was generated from the primary data 500a, 500b, and up to 500c, and cannot be used to rebuild any of that primary data 500a, 800, and up to 500c in the event it becomes unavailable.

However, as discussed below, the determination and storage of the interim parity data 812 allows for the updating of the parity data 502 stored in the storage subsystem 306 in the RAID parity data storage device 206d to be deferred, and the journal data 702 provided in the storage subsystem 202a of the host system 202 allows for data recovery from a failure (e.g., a power loss for the RAID storage system 200) that occurs prior to the updating of the parity data 502 stored in the storage subsystem 306 in the RAID parity data storage device 206d.

As discussed above, the deferred parity data updates of the present disclosure may be particularly beneficial in situations where an application (e.g., running on the host system 202) repeatedly writes and/or updates data in the same storage location (e.g., the same location in the storage subsystem 306 in the RAID primary data storage device 206b, i.e., the same NAND flash memory device location(s)), and the example illustrated for the second iteration of the method 400 in FIGS. 8A-8E provides such writes and/or updates of the primary data 600 with the primary data 800 in the same storage location in the storage subsystem 306 of the RAID primary data storage device 206b. Thus, because the journal data 702 indicates an inconsistent parity stripe for that particular storage location, subsequent changes to the primary data (e.g., from the primary data 600 to the primary data 800) at that same storage location in the storage subsystem 306 in the RAID primary data storage device 206b do not require changes, updates, and/or modifications to that journal data 702/ journal entry. As such, in this second iteration of the method 400, optional block 408 is not performed. However, in the event a new storage location were to be used to write/update primary data stored in the RAID primary data storage device(s), one of skill in the art in possession of the present disclosure will recognize how optional block 408 would be performed similarly as discussed above to indicate the inconsistent parity stripe that would result.

If, at decision block 410, it is determined that the parity update requirement has been met, the method 400 then proceeds to block 412 where the RAID parity data storage device receives a command from the RAID storage controller device. In an embodiment, at block 412, the RAID storage controller device 204 may generate and transmit a command to a RAID parity data storage device. For example, and as discussed above, the RAID storage controller device 204 may determine that the parity update requirement has been met as discussed above and, in response, at block 412 the RAID storage controller device 204 may generate a command 900 and transmit the command 900 to the RAID parity data storage device 206d.

Similarly as discussed above, the command 900 may be a multi-operation command like those described in U.S. patent application Ser. No. 16/585,296, filed on Sep. 27, 2019. For example, the command 900 may be a three-input NVMe WRITE WITH XOR multi-operation command that is configured to cause the RAID parity data storage device 206d to perform the multiple operations described below. However, while described as providing a multi-operation command at block 412, one of skill in the art in possession of the present disclosure will recognize that the multiple operations performed by the RAID parity data storage device 206d discussed below may be performed in response to respective commands transmitted by the RAID storage controller device 204 while remaining within the scope of the present disclosure as well. In a specific example, the transmission of the command 900 may include the RAID storage controller device 204 providing the command 900 in a submission queue that is included in the communication system 310 in the RAID parity data storage device 206d/ 300, and then ringing a doorbell for the RAID parity data storage device 206d/300. However, one of skill in the art in possession of the present disclosure will recognize that the command 900 may be provided to the RAID parity data storage device 206d in a variety of manners that will fall within the scope of the present disclosure as well.

As such, in some examples the RAID storage engine 304 in the RAID parity data storage device 206d/300 may respond to the ringing of its doorbell by accessing the command 900 in the submission queue in its communication system 310. In embodiments in which the command 900 is a multi-operation command, the RAID storage engine 304 in the RAID parity data storage device 206d/300 may identify the multiple operations instructed by that command 900 (as described in U.S. patent application Ser. No. 16/585,296, filed on Sep. 27, 2019.)

Figure 9A:
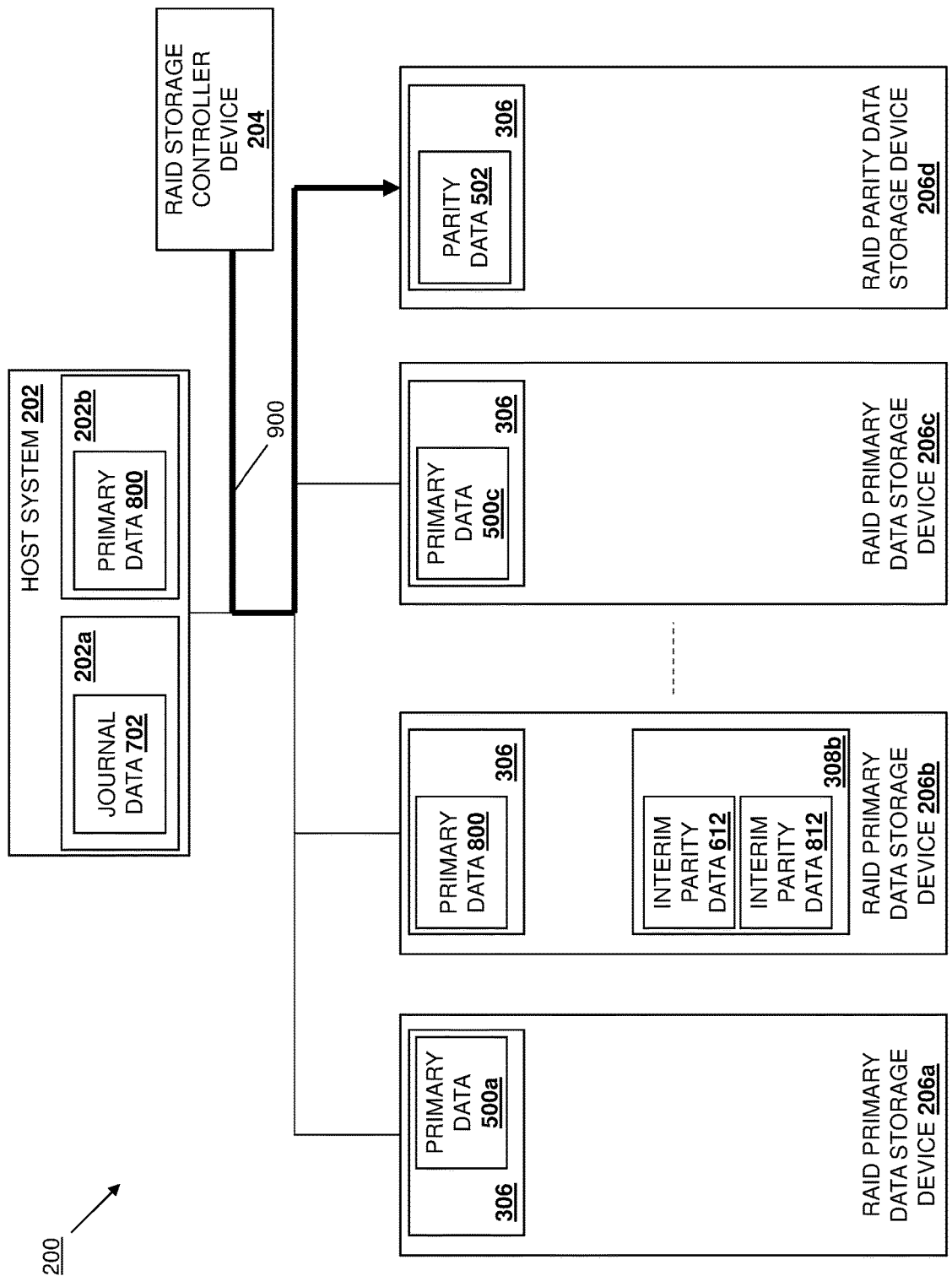
FIG. 9A is a schematic view illustrating an embodiment of the RAID storage system of FIG. 2 operating during the method of FIG. 4.
Figure 9B:
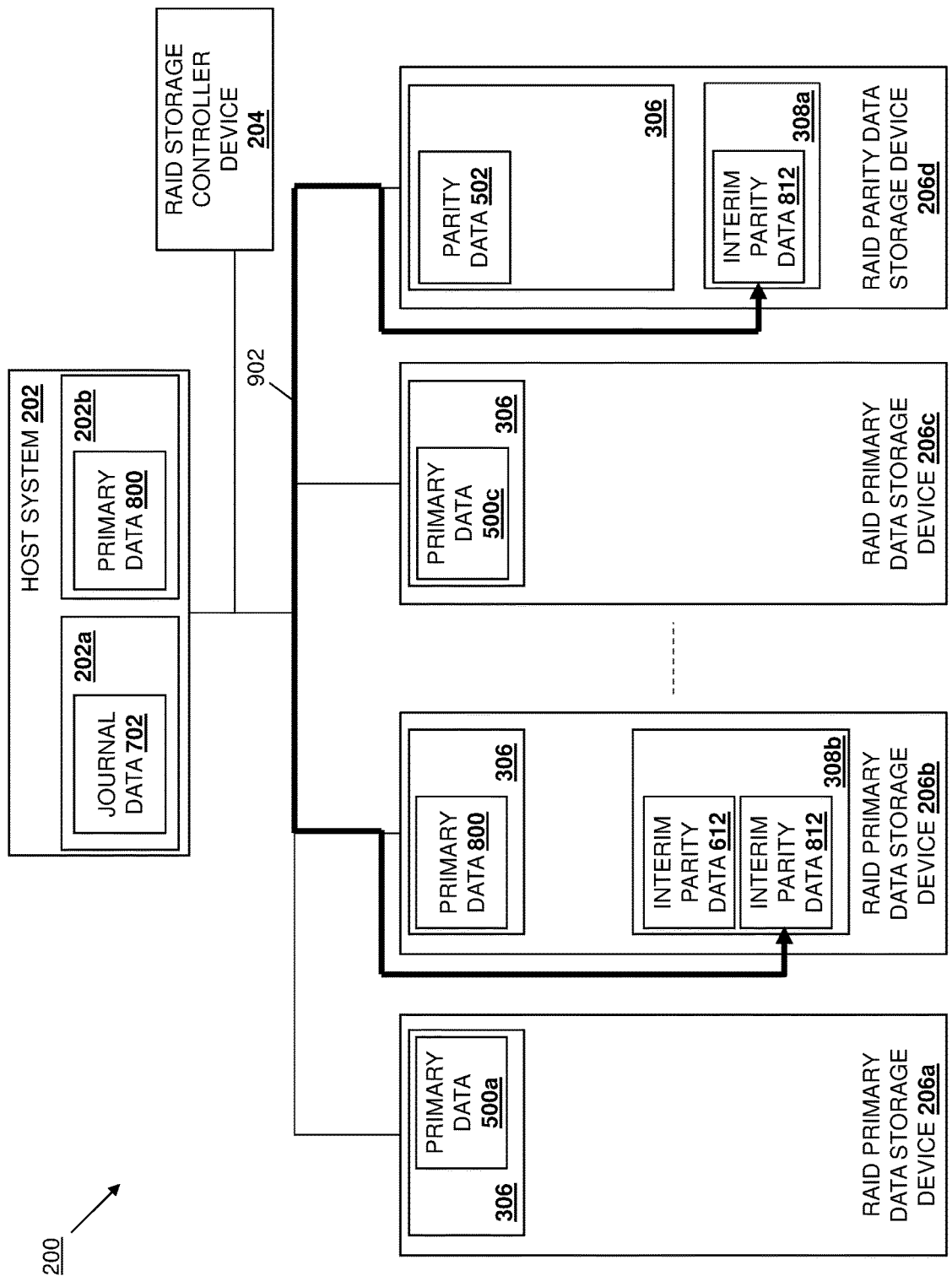
FIG. 9B is a schematic view illustrating an embodiment of the RAID storage system of FIG. 2 operating during the method of FIG. 4.

The method 400 then proceeds to block 414 where the RAID parity data storage device writes interim parity data from the RAID primary data storage device to its buffer subsystem. With reference to FIG. 9B, in an embodiment of block 414 and based on the command 900 (which is a multi-operation command as described above in this embodiment), the RAID storage engine 304 in the RAID parity data storage device 206d/300 may operate to perform a Direct Memory Access (DMA) operation 902 that accesses the interim parity data 812 that is stored in the second buffer subsystem 308b in the RAID primary data storage device 206b, and writes that interim parity data 812 to its first buffer subsystem 308a (e.g., in a device buffer in the RAID primary data storage device 206b as described in the example above).

Figure 9C:
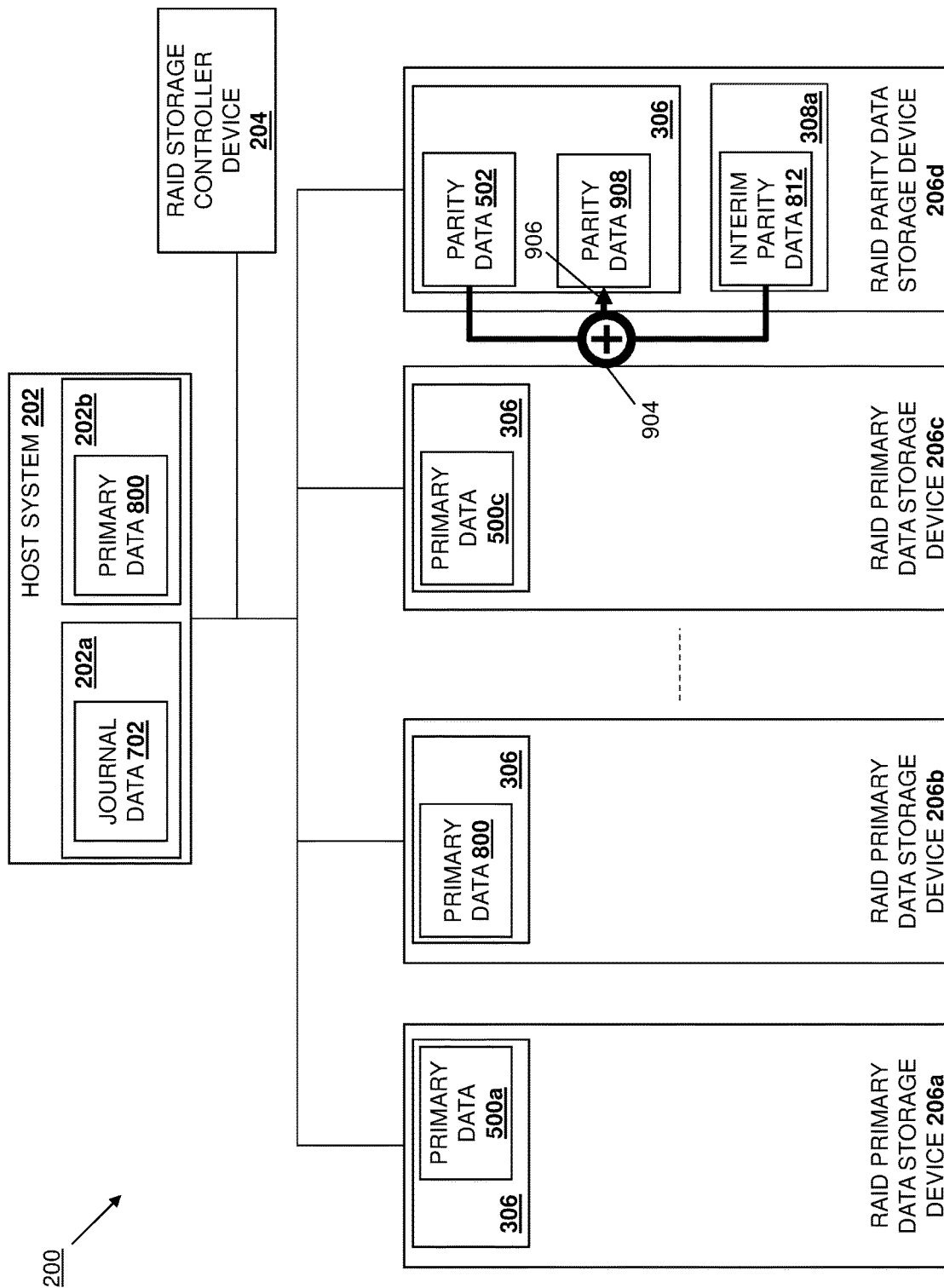
FIG. 9C is a schematic view illustrating an embodiment of the RAID storage system of FIG. 2 operating during the method of FIG. 4.

The method 400 then proceeds to block 416 where the RAID parity data storage device performs an XOR operation on current parity data and interim parity data to produce updated parity data, and overwrites the current parity data with the updated parity data. With reference to FIG. 9C, in an embodiment of block 416 and based on the command 900 (which is a multi-operation command as described above in this embodiment), the RAID storage engine 304 in the RAID parity data storage device 206d/300 may operate to perform an XOR operation 904 using the parity data 502 in its storage subsystem 306 and the interim parity data 812 in its first buffer subsystem 308a in order to produce parity data 908, and then perform an overwrite operation 906 to overwrite the parity data 502 with the parity data 908 in its storage subsystem 306 (as illustrated by the replacement of parity data 502 from FIG. 9C with parity data 908 in FIG. 9D.) As will be appreciated by one of skill in the art in possession of the present disclosure, the XOR operation 904 performed using the parity data 502 and the interim parity data 812 produces parity data 908 that may be used to recovery any one of the primary data 500a, 800, and up to 500c in the event it becomes unavailable.

Figure 9D:
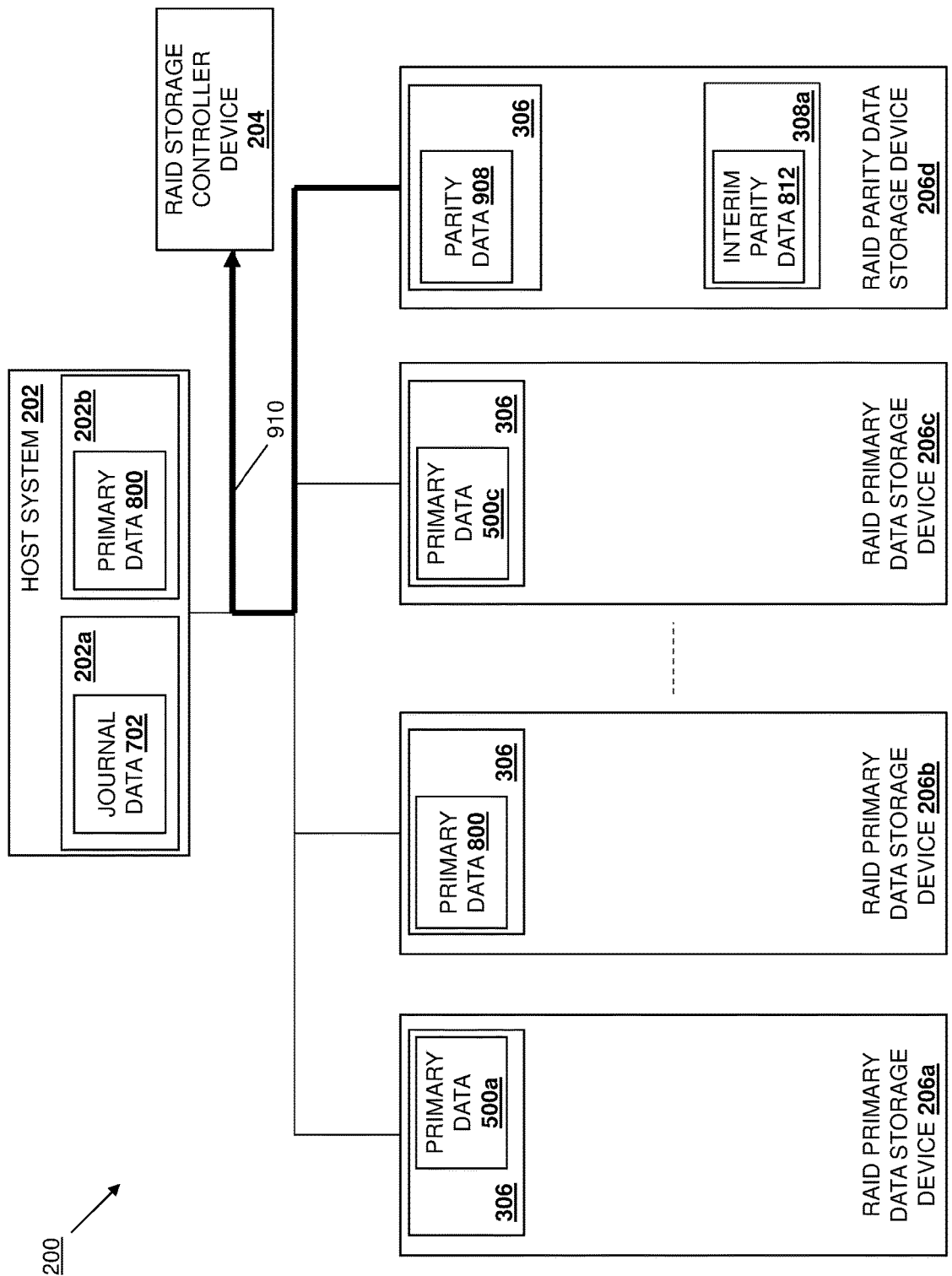
FIG. 9D is a schematic view illustrating an embodiment of the RAID storage system of FIG. 2 operating during the method of FIG. 4.

With reference to FIG. 9D, following completion of the operations associated with the command 900 (e.g., multiple operations associated with a multi-operation command as discussed above, following each operation associated with respective commands, etc.) the RAID storage engine 304 in the RAID parity data storage device 206d/300 may generate and transmit a completion message 910 to the RAID storage controller device 204. For example, the RAID storage engine 304 in the RAID parity data storage device 206d/300 may generate the completion message 910 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

Figure 10:
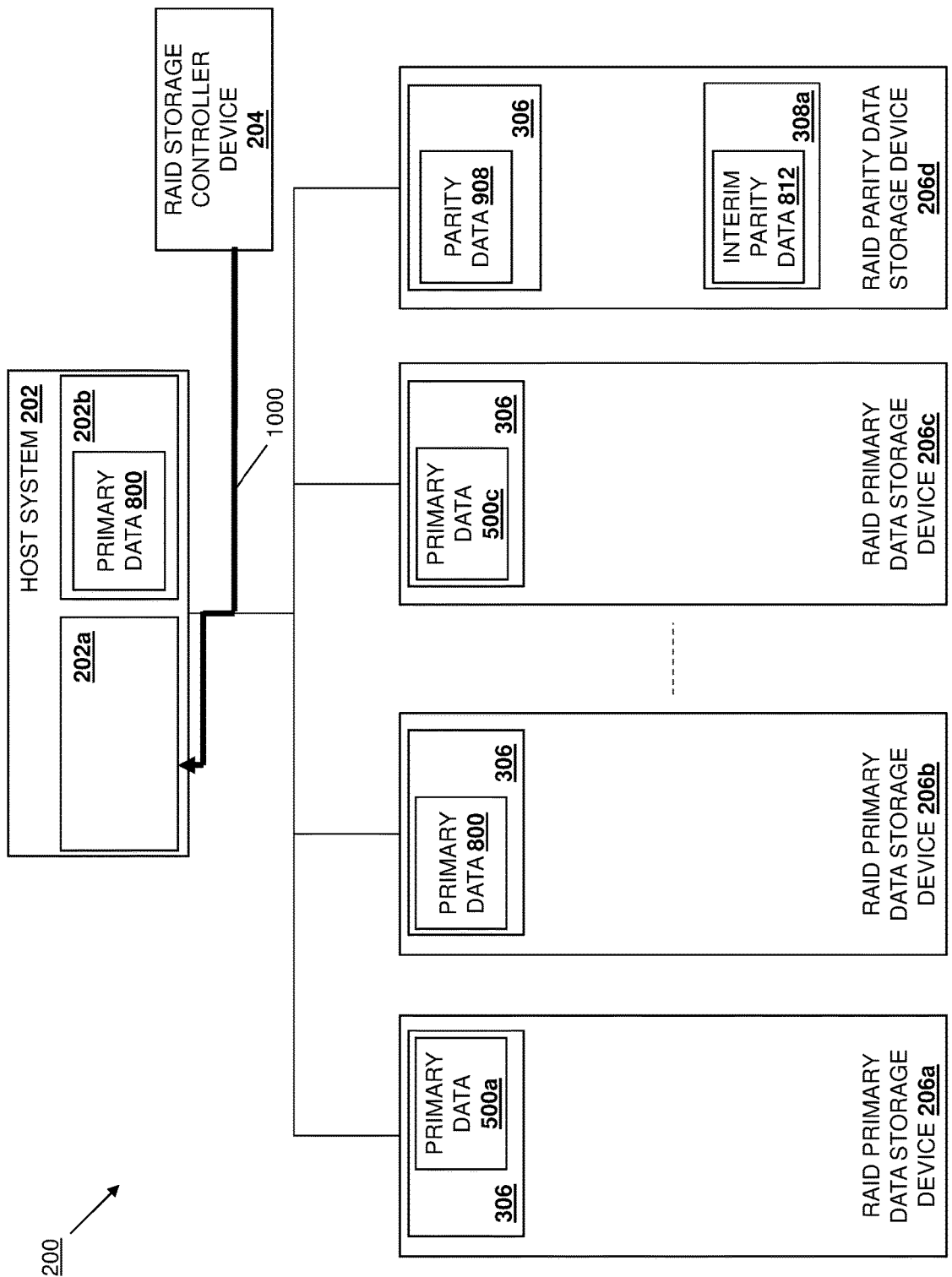
FIG. 10 is a schematic view illustrating an embodiment of the RAID storage system of FIG. 2 operating during the method of FIG. 4.

The method 400 then proceeds to block 418 were the RAID storage controller device removes the journal entry in the host system that indicates the inconsistent parity stripe. With reference to FIG. 10, at block 418 and in response to receiving the completion message 910 from the RAID parity data storage device 206d, the RAID storage controller device 204 may perform an inconsistent parity stripe journal entry removal operation 1000 that operates to delete, clear, and/or otherwise remove the journal data 702 in the storage subsystem 202a (e.g., an NVDIMM memory device) under control of the host system 202. As will be appreciated by one of skill in the art in possession of the present disclosure, the updating of the parity data on the RAID parity data storage device 206d (e.g., overwriting the parity data 502 with the parity data 908 in the storage subsystem 306 as discussed above) provides a "consistent parity stripe" for the data stripe that includes primary data 500a, 800, and up to 500c, as the parity data 908 may be used to rebuild any of that primary data 500a, 800, and up to 500c in the event it becomes unavailable.

Thus, systems and methods have been described that provide for the performance of deferred parity data update operations to backup data in a RAID storage system with the assistance of the RAID storage devices that store that data. For example, a RAID primary data storage device may perform an XOR operation on current primary data in its first storage subsystem and new primary data to produce interim parity data, write the interim parity data to its first buffer subsystem, and send a completion message to the RAID storage controller device. In response to receiving the completion message, the RAID storage controller device may provide a journal entry in the host system that indicates an inconsistent parity stripe, while the RAID primary data storage device overwrites the current primary data with the new primary data in its first storage subsystem such that the new primary data becomes current primary data, with the interim parity data becoming current interim parity data.

Subsequently, as long as a parity update requirement is not met, the RAID primary data storage device may retrieve new primary data from the host system via a DMA operation, perform an XOR operation on the current primary data in its first storage subsystem, the current interim parity data in its first buffer subsystem, and the new primary data to produce updated interim parity data, write the updated interim parity data to its first buffer subsystem, overwrite the current primary data with the new primary data in its first storage subsystem (with the new primary data becoming current primary data), and send a completion message to the RAID storage controller device. In many cases, the overwriting of the current primary data with the new primary data in its first storage subsystem is to the same memory location such that the RAID storage controller device need not provide or update any journal entry in the host system that indicates an inconsistent parity stripe. However, if the writing of the new primary data in its first storage subsystem is to any different memory location, the RAID storage controller device may provide or update journal entry(ies) in the host system that indicate an inconsistent parity stripe.

Once the parity update requirement is met, the RAID parity data storage device may then retrieve the current interim parity data via a DMA operation from the first buffer subsystem in the RAID primary data storage device, perform an XOR operation on current parity data in its second storage subsystem and the current interim parity data to produce updated parity data, overwrite the current parity data with the updated parity data in the second storage subsystem, and send a completion message to the RAID storage controller device. In response to receiving the completion message, the RAID storage controller device may remove the journal entry in the host system that indicates the inconsistent parity stripe. As such, deferred parity update operations are offloaded from the RAID storage controller device, thus increasing the ability of the RAID storage controller device to scale with high performance RAID storage devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A deferred parity update system, comprising:
a host system;
a Redundant Array of Independent Disk (RAID) primary storage device that is coupled to the host system;
a RAID parity storage device that is coupled to the host system; and
a RAID storage controller device that is coupled to the host system, the RAID primary storage device, and the RAID parity storage device, wherein the RAID storage controller device is configured to:
receive, from the host system, a first write command and, in response, generate at least one first RAID primary data storage device command that is configured to cause the RAID primary data storage device to retrieve second primary data from the host system, produce first interim parity data using first primary data stored on the first RAID primary data storage device and the second primary data, and provide a first RAID primary data storage device command completion message to the RAID storage controller device;
create, in response to receiving the first RAID primary data storage device command completion message, a journal entry that indicates an inconsistent parity stripe;
receive, from the host system, a second write command and, in response, generate at least one second RAID primary data storage device command that is configured to cause the RAID primary data storage device to retrieve third primary data from the host system, and produce second interim parity data using second primary data, the third primary data, and the first interim parity data;
determine that a parity data update requirement has been satisfied and, in response, generate at least one RAID parity data storage device command that is configured to cause the RAID parity data storage device to retrieve the second interim parity data from the RAID primary data storage device, produce second parity data using first parity data stored on the RAID parity data storage device and the second interim parity data, update the first parity data with second parity data, and provide a RAID parity data storage device command completion message to the RAID storage controller device; and
remove, in response to receiving the RAID parity data storage device command completion message, the journal entry that indicates the inconsistent parity stripe.

2. The system of claim 1, wherein the at least one first RAID primary data storage device command is configured to cause the RAID primary data storage device to update the first primary data with the second primary data, and wherein the at least one second RAID primary data storage device command is configured to cause the RAID primary data storage device to update the second primary data with the third primary data.

3. The system of claim 1, wherein the at least one first RAID primary data storage device command is configured to cause the RAID primary data storage device to store the first interim parity data in a Controller Memory Buffer (CMB) included in the RAID primary data storage device, and wherein the at least one second RAID primary data storage device command is configured to cause the RAID primary data storage device to store the second interim parity data in the CMB included in the RAID primary data storage device.

4. The system of claim 1, wherein the journal entry that indicates the inconsistent parity stripe is created in an NVDIMM device that is controlled by the host system.

5. The system of claim 1, wherein the at least one RAID parity data storage device command is configured to cause the RAID parity data storage device to retrieve the second interim parity data from the RAID primary data storage device using a Direct Memory Access (DMA) operation.

6. The system of claim 1, wherein the RAID storage controller device is configured to:
provide, in response to a providing the journal entry that indicates the inconsistent parity stripe, a first write command completion message to host system.

7. An Information Handling System (IHS), comprising:
a processing system; and
a memory system that includes instructions that, when executed by the processing system, cause the processing system to provide a Redundant Array of Independent Disk (RAID) storage controller that is configured to:
receive, from a host system, a first write command and, in response, generate at least one first RAID primary data storage device command that is configured to cause a RAID primary data storage device to retrieve second primary data from the host system, produce first interim parity data using first primary data stored on the first RAID primary data storage device and the second primary data, and provide a first RAID primary data storage device command completion message to the RAID storage controller device;
create, in response to receiving the first RAID primary data storage device command completion message, a journal entry that indicates an inconsistent parity stripe;
receive, from the host system, a second write command and, in response, generate at least one second RAID primary data storage device command that is configured to cause the RAID primary data storage device to retrieve third primary data from the host system, and produce second interim parity data using second primary data, the third primary data, and the first interim parity data;
determine that a parity data update requirement has been satisfied and, in response, generate at least one RAID parity data storage device command that is configured to cause a RAID parity data storage device to retrieve the second interim parity data from the RAID primary data storage device, produce second parity data using first parity data stored on the RAID parity data storage device and the second interim parity data, update the first parity data with second parity data, and provide a RAID parity data storage device command completion message to the RAID storage controller device; and
remove, in response to receiving the RAID parity data storage device command completion message, the journal entry that indicates the inconsistent parity stripe.

8. The IHS of claim 7, wherein the at least one first RAID primary data storage device command is configured to cause the RAID primary data storage device to update the first primary data with the second primary data, and wherein the at least one second RAID primary data storage device command is configured to cause the RAID primary data storage device to update the second primary data with the third primary data.

9. The IHS of claim 7, wherein the at least one first RAID primary data storage device command is configured to cause the RAID primary data storage device to store the first interim parity data in a Controller Memory Buffer (CMB) included in the RAID primary data storage device, and wherein the at least one second RAID primary data storage device command is configured to cause the RAID primary data storage device to store the second interim parity data in the CMB included in the RAID primary data storage device.

10. The IHS of claim 7, wherein the journal entry that indicates the inconsistent parity stripe is provided in an NVDIMM device that is controlled by the host system.

11. The IHS of claim 7, wherein the at least one RAID parity data storage device command is configured to cause the RAID parity data storage device to retrieve the second interim parity data from the RAID primary data storage device using a Direct Memory Access (DMA) operation.

12. The IHS of claim 7, wherein the RAID storage controller is configured to:
provide, in response to providing the journal entry that indicates the inconsistent parity stripe, a first write command completion message to host system.

13. The IHS of claim 7, wherein the determining that the parity data update requirement has been satisfied includes at least one of:
determining that a time period has passed; or
determine that the RAID primary storage device has produced interim parity data a predetermined number of times.

14. A method for providing deferred parity data updates, comprising:
receiving, by a RAID storage controller device from a host system, a first write command and, in response, generating at least one first RAID primary data storage device command that is configured to cause a RAID primary data storage device to retrieve second primary data from the host system, produce first interim parity data using first primary data stored on the first RAID primary data storage device and the second primary data, and provide a first RAID primary data storage device command completion message to the RAID storage controller device;
creating, by the RAID storage controller device in response to receiving the first RAID primary data storage device command completion message, a journal entry that indicates an inconsistent parity stripe;
receiving, by the RAID storage controller device from the host system, a second write command and, in response, generating at least one second RAID primary data storage device command that is configured to cause the RAID primary data storage device to retrieve third primary data from the host system, and produce second interim parity data using second primary data, the third primary data, and the first interim parity data;
determining, by the RAID storage controller device, that a parity data update requirement has been satisfied and, in response, generating at least one RAID parity data storage device command that is configured to cause a RAID parity data storage device to retrieve the second interim parity data from the RAID primary data storage device, produce second parity data using first parity data stored on the RAID parity data storage device and the second interim parity data, update the first parity data with second parity data, and provide a RAID parity data storage device command completion message to the RAID storage controller device; and removing, by the RAID storage controller device in response to receiving the RAID parity data storage device command completion message, the journal entry that indicates the inconsistent parity stripe.

15. The method of claim 14, wherein the at least one first RAID primary data storage device command is configured to cause the RAID primary data storage device to update the first primary data with the second primary data, and wherein the at least one second RAID primary data storage device command is configured to cause the RAID primary data storage device to update the second primary data with the third primary data.

16. The method of claim 14, wherein the at least one first RAID primary data storage device command is configured to cause the RAID primary data storage device to store the first interim parity data in a Controller Memory Buffer (CMB) included in the RAID primary data storage device, and wherein the at least one second RAID primary data storage device command is configured to cause the RAID primary data storage device to store the second interim parity data in the CMB included in the RAID primary data storage device.

17. The method of claim 14, wherein the journal entry that indicates the inconsistent parity stripe is provided in an NVDIMM device that is controlled by the host system.

18. The method of claim 14, wherein the at least one RAID parity data storage device command is configured to cause the RAID parity data storage device to retrieve the second interim parity data from the RAID primary data storage device using a Direct Memory Access (DMA) operation.

19. The method of claim 14, further comprising:
providing, by the RAID storage controller device in response to providing the journal entry that indicates the inconsistent parity stripe, a first write command completion message to host system.

20. The method of claim 14, wherein the determining that the parity data update requirement has been satisfied includes at least one of:
determining that a time period has passed; or
determine that the RAID primary storage device has produced interim parity data a predetermined number of times.

* * * * *